United States Patent [19]

Smith et al.

[11] Patent Number: 4,910,585
[45] Date of Patent: Mar. 20, 1990

[54] FREQUENCY SELECTIVE VIDEO SIGNAL INTRAFRAME PROCESSOR

[75] Inventors: Terrence R. Smith, Westmont; Michael A. Isnardi, Plainsboro; Robert N. Hurst, Jr., Hopewell, all of N.J.

[73] Assignee: General Electric Company, Princeton, N.J.

[21] Appl. No.: 215,123

[22] Filed: Jun. 29, 1988

[51] Int. Cl.$^4$ ............................................. H04N 11/00
[52] U.S. Cl. ......................................... 358/12; 358/31
[58] Field of Search ......................... 358/12, 15, 16, 31

[56] References Cited

U.S. PATENT DOCUMENTS

| | | | |
|---|---|---|---|
| 4,266,240 | 5/1981 | Levy | 358/3 |
| 4,287,528 | 9/1981 | Levy | 358/3 |
| 4,456,922 | 6/1984 | Balaban et al. | 358/31 |
| 4,701,783 | 10/1987 | Glenn | 358/16 |

FOREIGN PATENT DOCUMENTS

| | | | |
|---|---|---|---|
| 281696 | 12/1986 | Japan . | |
| 2054313 | 2/1981 | United Kingdom | 358/31 |
| 2072991 | 10/1981 | United Kingdom | 358/31 |
| 2079091 | 1/1982 | United Kingdom | 358/31 |

OTHER PUBLICATIONS

T. Fukinuki, et al., "Experiments on Proposed Extended Definition TV with Full NTSC Compatibility", SMPTE Journal, Oct. 1984, pp. 923–939.

Primary Examiner—John W. Shepperd
Attorney, Agent, or Firm—Joseph S. Tripoli; Eric P. Herrmann; Ronald H. Kurdyla

[57] ABSTRACT

A widescreen television signal containing center panel information and time compressed side panel information in an overscan region is intraframe processed above a given frequency only with respect to the center panel information. The intraframe processing apparatus includes a signal delay network with first and second 262H delay elements coupled between an input and an output of the delay network. During a first field interval, signals from the delay input and from an intermediate point between the delay elements are subtractively combined to produce a difference term which is coupled to a signal path. During a second field interval, signals from the delay output and from the intermediate point are subtractively combined to produce a difference term which is coupled to the signal path. An intraframe processed output signal is produced by combining the difference terms from the signal path with a signal from the intermediate delay point. A filter and an electronic gate in the signal path determine frequency selective intraframe processing of the center panel information alone.

9 Claims, 27 Drawing Sheets

SINGLE CHANNEL NTSC COMPATIBLE WIDESCREEN EDTV SYSTEM

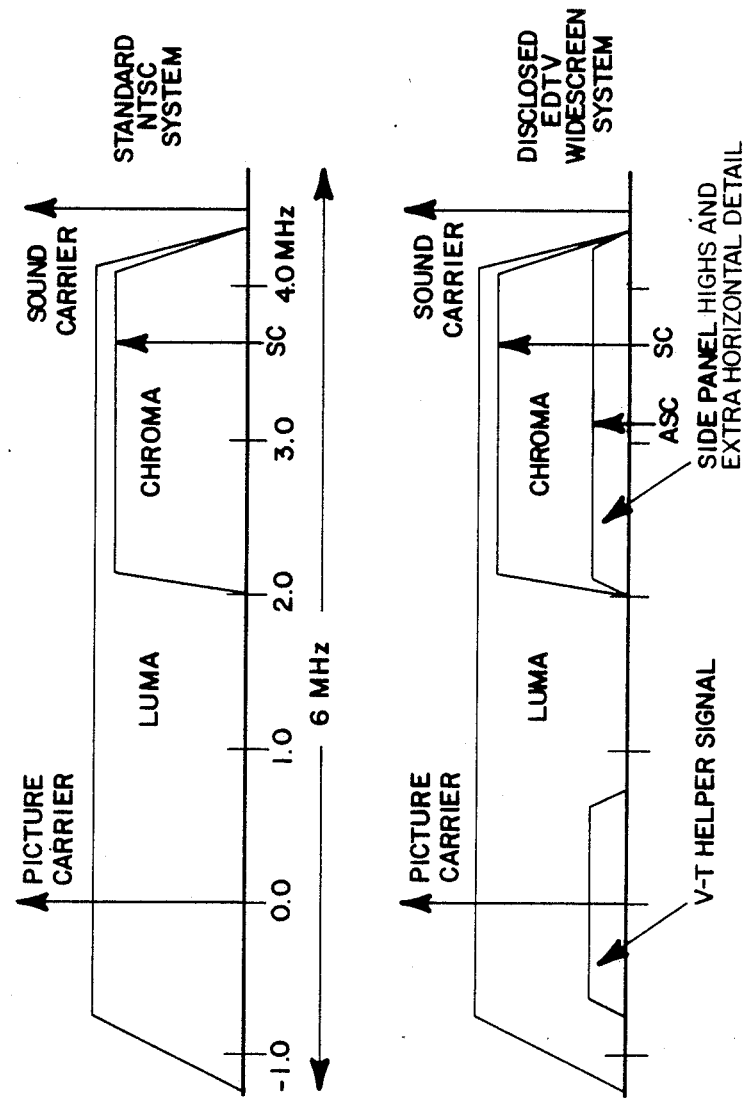

262-H INTRAFRAME AVERAGING

PROGRESSIVE SCAN TO 2:1 INTERLACE CONVERSION

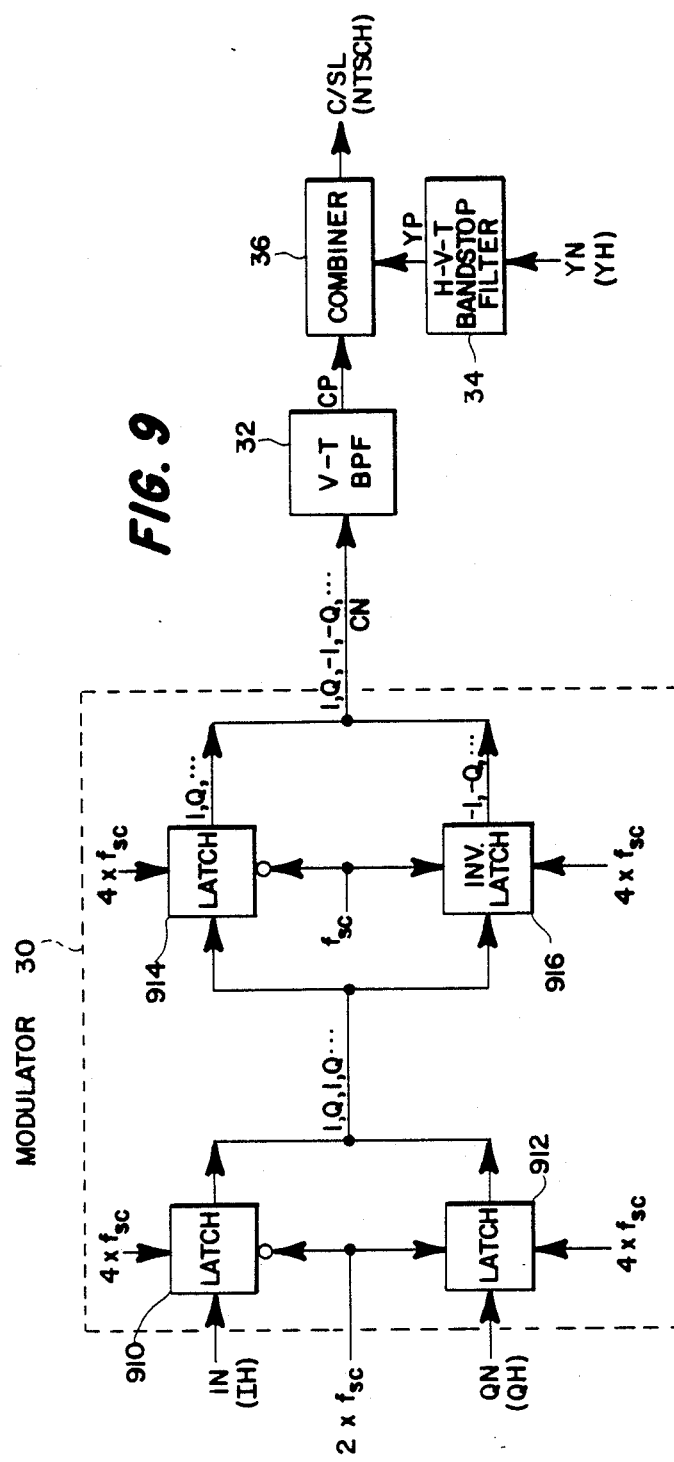

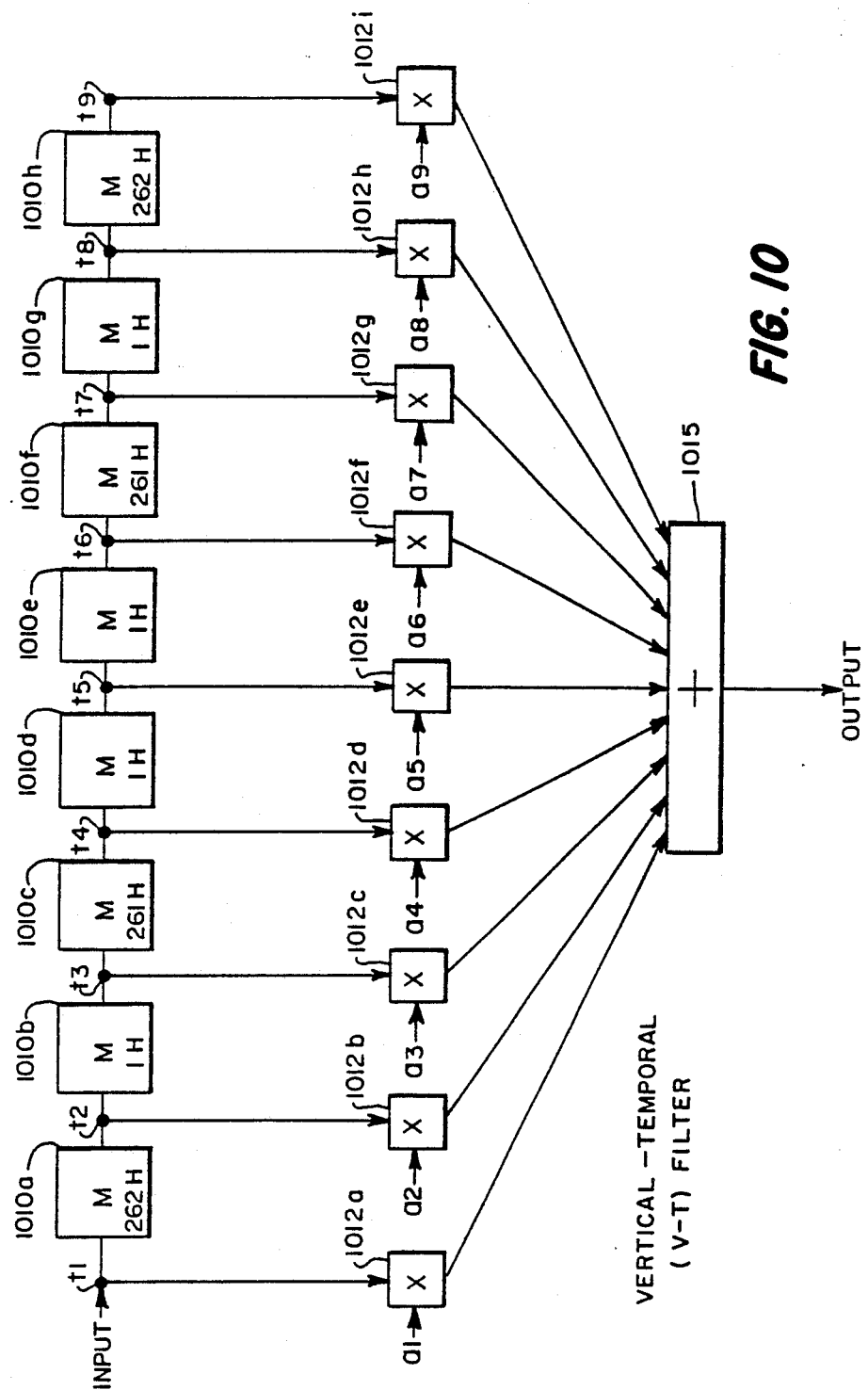

| | WEIGHTING COEFFICIENTS | | | | | | | | |
|---|---|---|---|---|---|---|---|---|---|
| | a1 | a2 | a3 | a4 | a5 | a6 | a7 | a8 | a9 |
| V-T BANDPASS FILTER | $\frac{1}{16}$ | $-\frac{1}{8}$ | $\frac{1}{8}$ | $-\frac{1}{16}$ | $\frac{1}{4}$ | $-\frac{1}{16}$ | $\frac{1}{8}$ | $-\frac{1}{8}$ | $\frac{1}{16}$ |
| V-T BANDSTOP FILTER | $\frac{1}{16}$ | $\frac{1}{8}$ | $-\frac{1}{8}$ | $\frac{1}{16}$ | $\frac{3}{4}$ | $\frac{1}{16}$ | $-\frac{1}{8}$ | $\frac{1}{8}$ | $\frac{1}{16}$ |
FIG. 10a
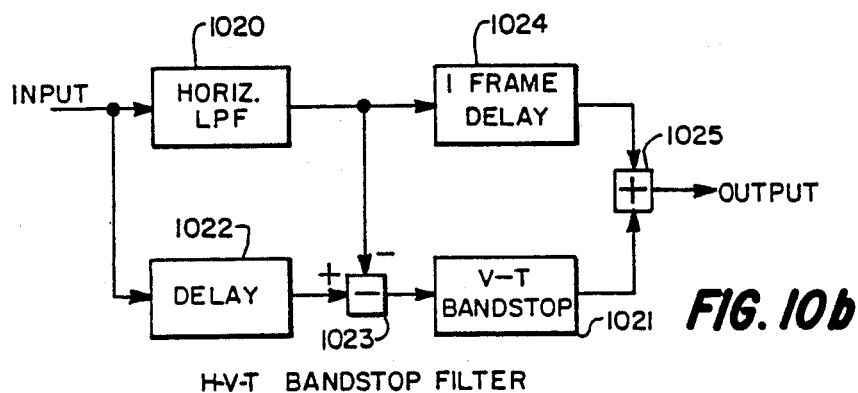
H-V-T BANDSTOP FILTER
FIG. 10b
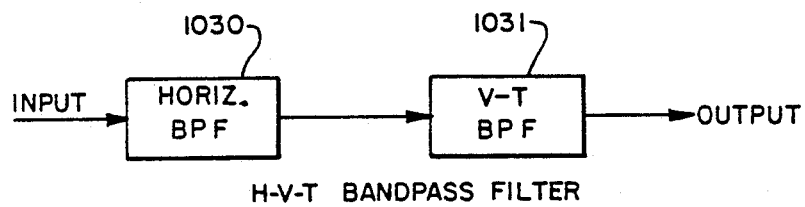
H-V-T BANDPASS FILTER
FIG. 10c

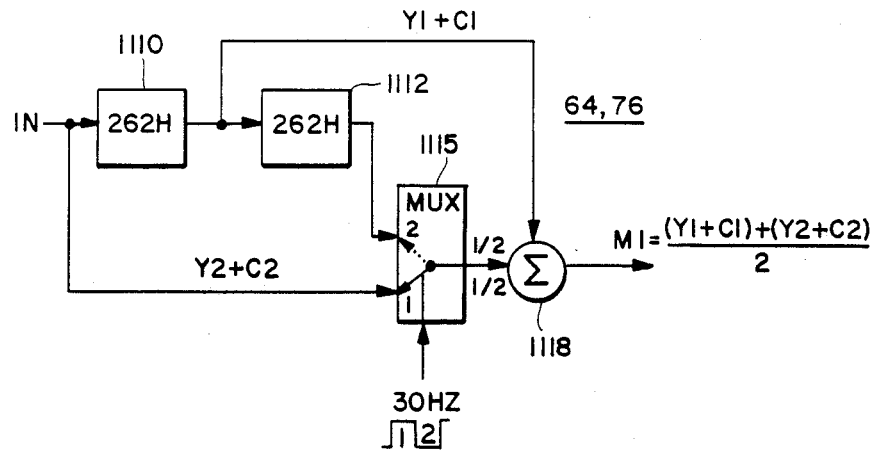
FIG. 11a
FIG. 11b
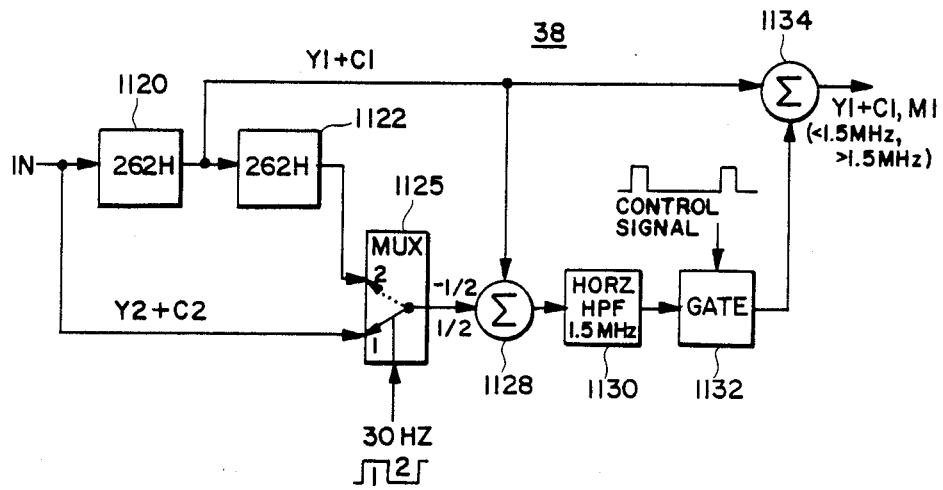

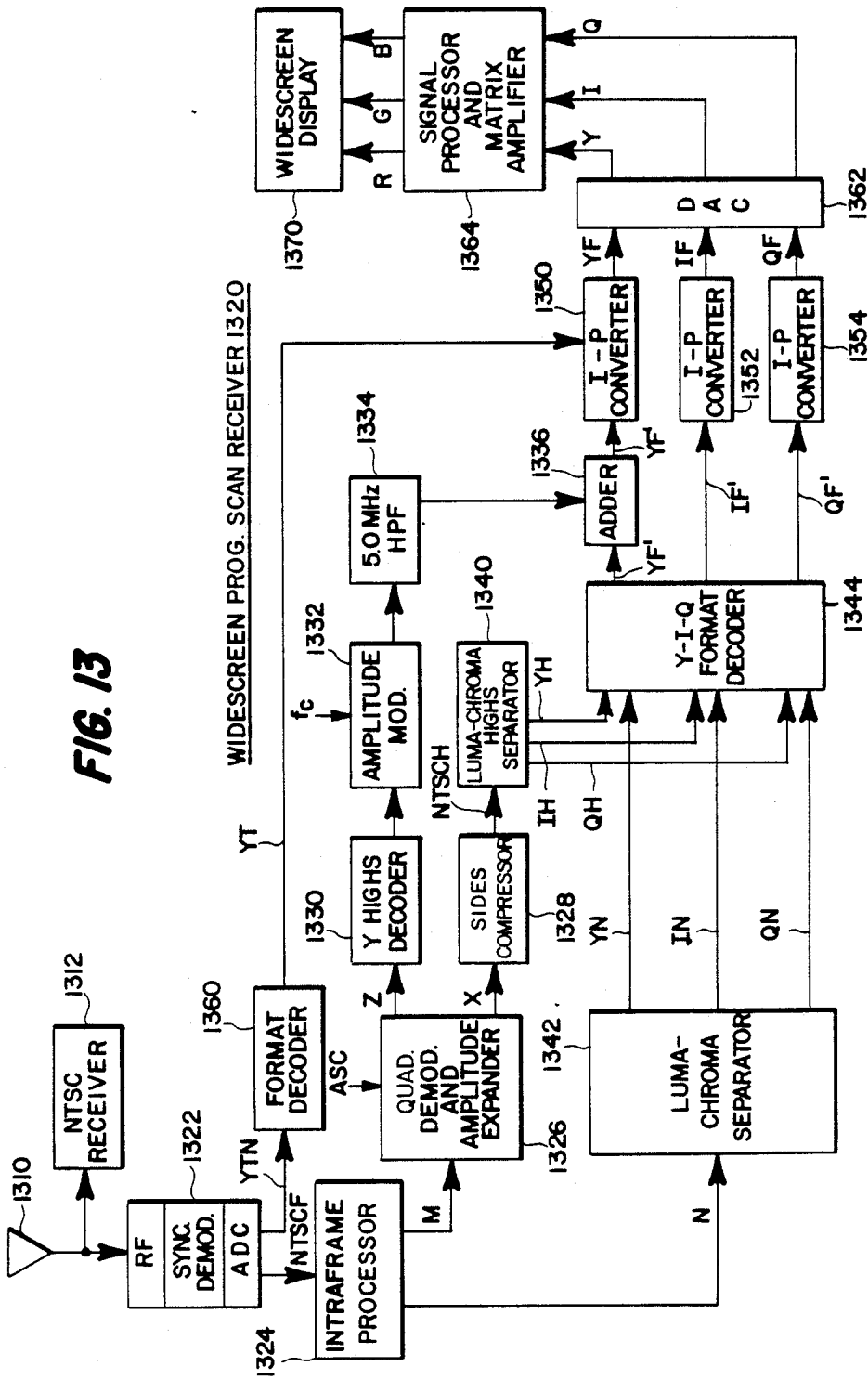

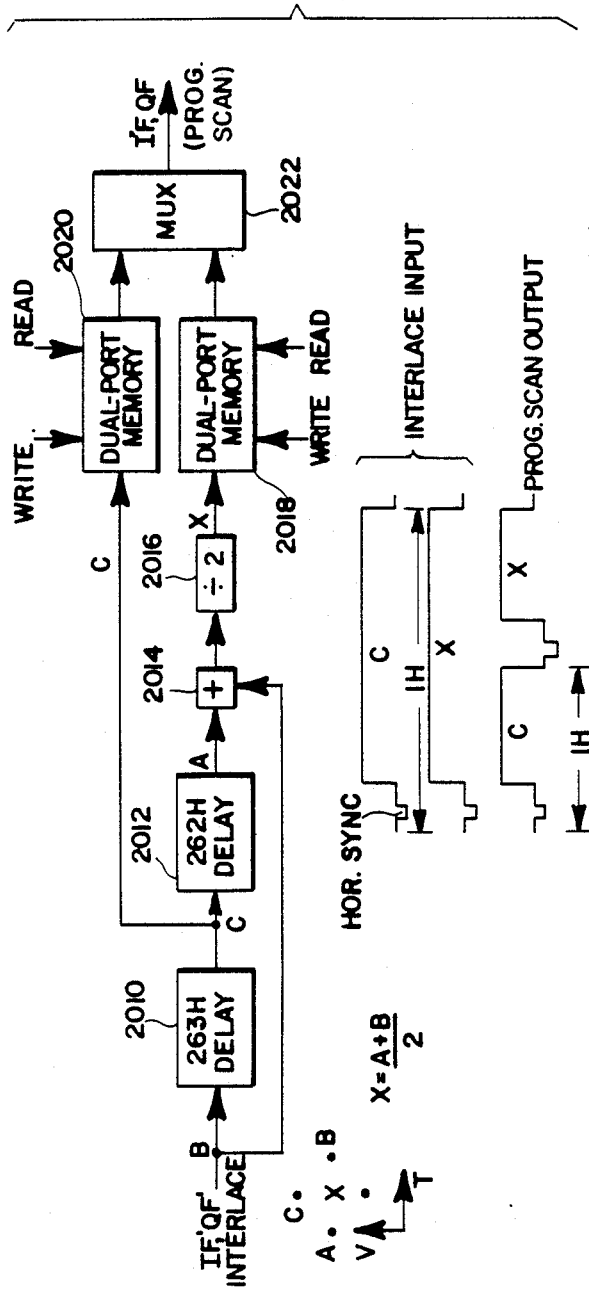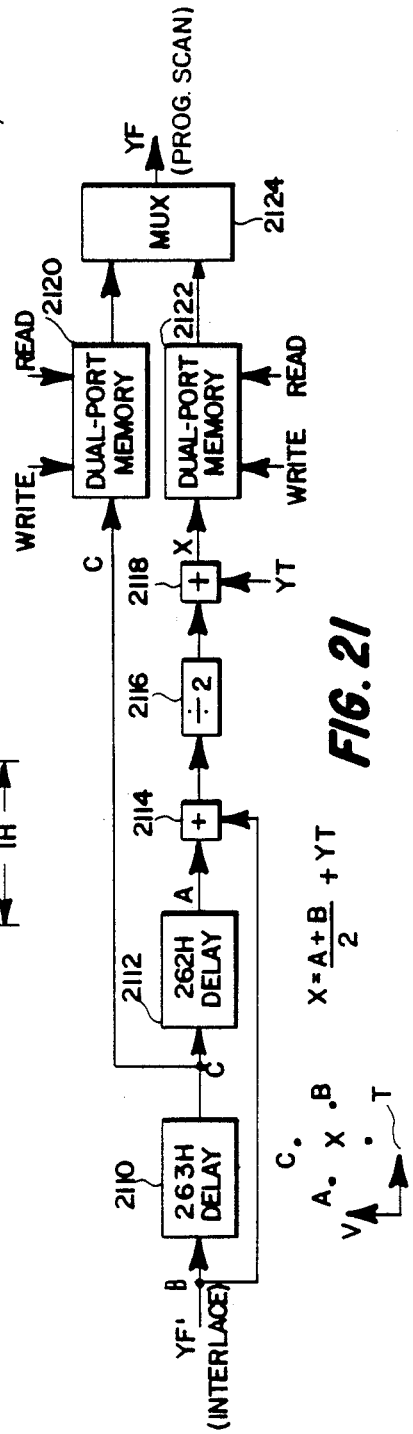

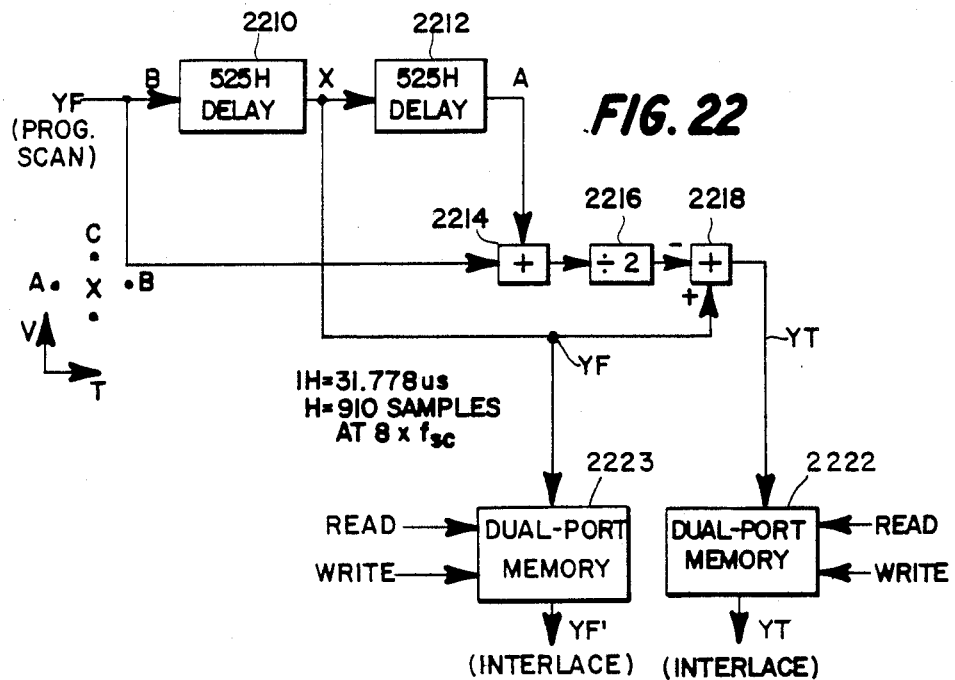

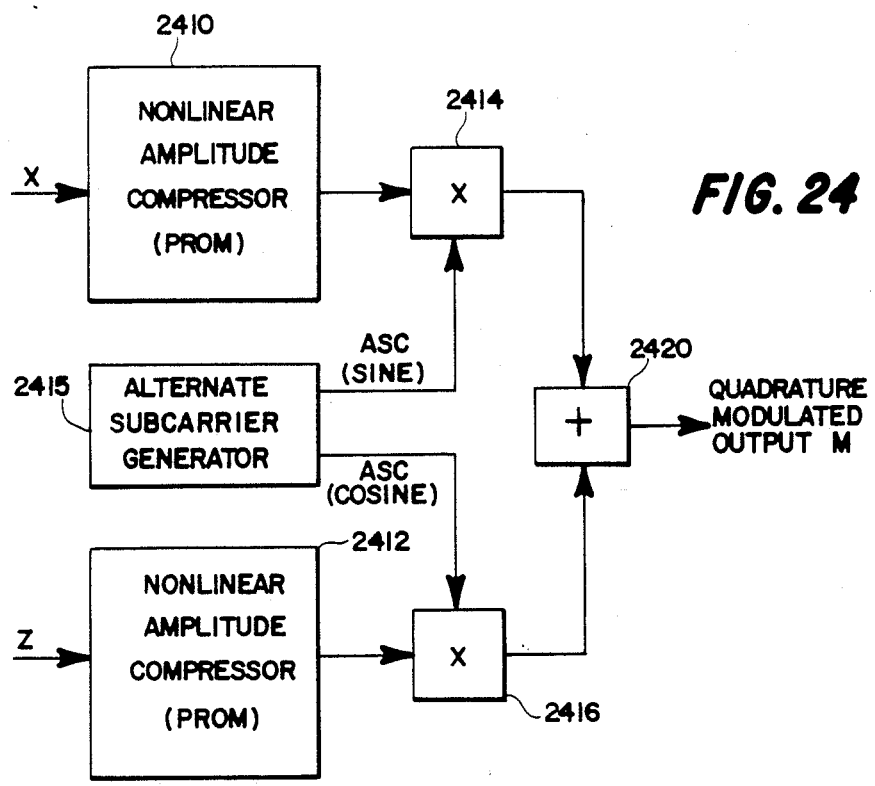
FIG. 24
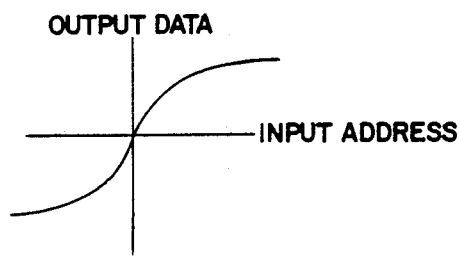

FREQUENCY SELECTIVE VIDEO SIGNAL INTRAFRAME PROCESSOR

BACKGROUND OF THE INVENTION

This invention concerns apparatus to facilitate the frequency selective intraframe processing of a video signal. In particular, this invention concerns such apparatus in a widescreen television system for processing a video signal containing center panel and side panel image information.

A conventional television receiver, such as a receiver in accordance with NTSC broadcast standards adopted in the United States and elsewhere, has a 4:3 aspect ratio (the ratio of the width to the height of a displayed image). Recently, there has been interest in using higher aspect ratios for television receiver systems, such as 2:1, 16:9 or 5:3, since such higher aspect ratios more nearly approximate or equal the aspect ratio of the human eye than does the 4:3 aspect ratio of a conventional television receiver. Video information signals with a 5:3 aspect ratio have received particular attention since this ratio approximates that of motion picture film, and thus such signals can be transmitted and received without cropping the image information. However, widescreen television systems which simply transmit signals having an increased aspect ratio as compared to conventional systems are incompatible with conventional aspect ratio receivers. This makes widespread adoption of widescreen systems difficult.

It is therefore desirable to have a widescreen system which is compatible with conventional television receivers. One such system is disclosed in a copending U.S. patent application of C. H. Strolle et al., Ser. No. 078,150 titled "Compatible Widescreen Television System", filed July 27, 1987. It is even more desirable to have such a compatible widescreen system with provisions for enhancing or extending the definition of the displayed image so as to provide extra image detail. For example, such widescreen EDTV (extended definition television) system may include apparatus for providing a progressively scanned image. A system of this type is disclosed in a copending U.S. patent application Ser. No. 139,338 of M. A. Isnardi and R. N. Hurst, Jr., titled "Apparatus for Pre-Conditioning Auxiliary Television Signal Information", filed Dec. 29, 1987.

In the system disclosed by Isnardi and Hurst, a main component of a widescreen television signal contains center panel information as well as side panel information time compressed into a horizontal overscan region. Both the center panel information and the side panel information are intraframe averaged above a given frequency. An improved version of the Isnardi and Hurst system is described in a copending U.S. patent application Ser. No. (RCA 85010) of M. A. Isnardi and T. R. Smith titled "Widescreen Television Signal Processing System with Center and Side Panel Image Resolution Uniformity". Isnardi and Smith recognize that improved side panel image resolution can be achieved by not subjecting the time compressed side panel information to intraframe processing.

In accordance with the principles of the present invention there is disclosed herein apparatus arranged to facilitate intraframe video signal processing consistent with the objectives of the Isnardi and Hurst and the Isnardi and Smith systems. The disclosed apparatus requires only two image field storage devices which exhibit uncomplicated filtering requirements to perform frequency selective intraframe processing.

SUMMARY OF THE INVENTION

Apparatus in accordance with a disclosed preferred embodiment of the present invention includes a signal delay network with first and second 262H delay elements coupled between an input and an output of the delay network. During a first field interval, signals from the delay input and from an intermediate point between the delay elements are subtractively combined to produce a difference term which is coupled to a signal path. During a second field interval, signals from the delay output and from the intermediate point are subtractively combined to produce a difference term which is coupled to the signal path. An intraframe processed output signal is produced by combining the difference terms from the signal path with a signal from the intermediate delay point. Frequency selective intraframe processing is achieved by placing an appropriate filter in the signal path. Intraframe processing over a selected spatial portion of the input signal is achieved by placing an electronic gate in the signal path.

Apparatus in accordance with the principles of the present invention is disclosed in the context of a compatible widescreen EDTV television system employing time compression and intraframe signal processing, e.g., averaging, techniques. The widescreen EDTV signal contains plural components, including a main first component containing center panel and time compressed side panel information, and an auxiliary second component containing side panel information. In the main component, only center panel information above a given frequency is subjected to intraframe processing by means of the disclosed apparatus. The time compressed side panel information portion of the main component is not subjected to intraframe processing.

The first component is a main 2:1 interlaced signal with a standard 4:3 aspect ratio. This component comprises a central portion of the widescreen signal that has been time expanded to occupy nearly the entire 4:3 aspect ratio active line time, and side panel horizontal low frequency information that has been time compressed into the left and right horizontal image overscan regions where such information is hidden from view in a standard television receiver display. Only the central portion of this component is subjected to intraframe averaging above a given frequency.

The second component is an auxiliary 2:1 interlaced signal comprising left and right side panel high frequency information that have each been time expanded to half the active line time. Thus expanded side panel information occupies substantially the entire active line time. This component is "mapped" so as to occupy the same time period as the center portion of the first component, and is intraframe averaged.

A third component is an auxiliary 2:1 interlaced signal, derived from the widescreen signal source, comprising high frequency horizontal luminance detail information between approximately 5.0 MHz and 6.0 MHz. This component is also "mapped" so as to occupy the same time period as the center portion of the first component, and is also intraframe averaged. The intraframe averaged second and third components quadrature modulate a phase controlled alternate subcarrier which is combined with the intraframe averaged first component.

An optional fourth component is an auxiliary 2:1 interlaced "helper" signal comprising temporal field difference luminance detail information to help reconstruct missing image information at a widescreen EDTV receiver.

At a widescreen EDTV receiver, a composite signal containing the described four components is decoded into the constituent four components by means including the disclosed apparatus. The decoded components are processed separately and used to develop an image representative widescreen signal with enhanced resolution.

DESCRIPTION OF THE DRAWING

FIGS. 1b–1e contain diagrams helpful in understanding the operation of the disclosed system;

FIG. 11b illustrates intraframe processor apparatus according to the present invention in a signal encoder;

FIG. 13 shows a block diagram of a portion of widescreen EDTV receiver decoder apparatus; and FIGS. 6–11a, 12–14 and 17–24 illustrate other aspects of the disclosed system in greater detail.

A system intended to transmit wide aspect ratio pictures, e.g., 5:3, through a standard, e.g., NTSC, broadcast channel should achieve a high quality picture display by a widescreen receiver, while greatly reducing or eliminating observable degradations in a standard 4:3 aspect ratio display. The use of signal compression techniques on the side panels of a picture takes advantage of the horizontal overscan region of a standard NTSC television receiver display, but may sacrifice image resolution in the side panel regions of a reconstructed widescreen picture. Since compression in time results in an expansion in the frequency domain, only low frequency components would survive processing in a standard television channel, which exhibits a smaller bandwidth compared with that required for a widescreen signal. Thus, when the compressed side panels of a compatible widescreen signal are expanded in a widescreen receiver, there results a noticeable difference between the resolution or high frequency content of the center portion of a displayed widescreen picture and the side panels, unless steps are taken to avoid this effect. This noticeable difference is due to the fact that low frequency side panel information would be recovered, but high frequency information would be lost due to video channel bandlimiting effects.

Figure 1:
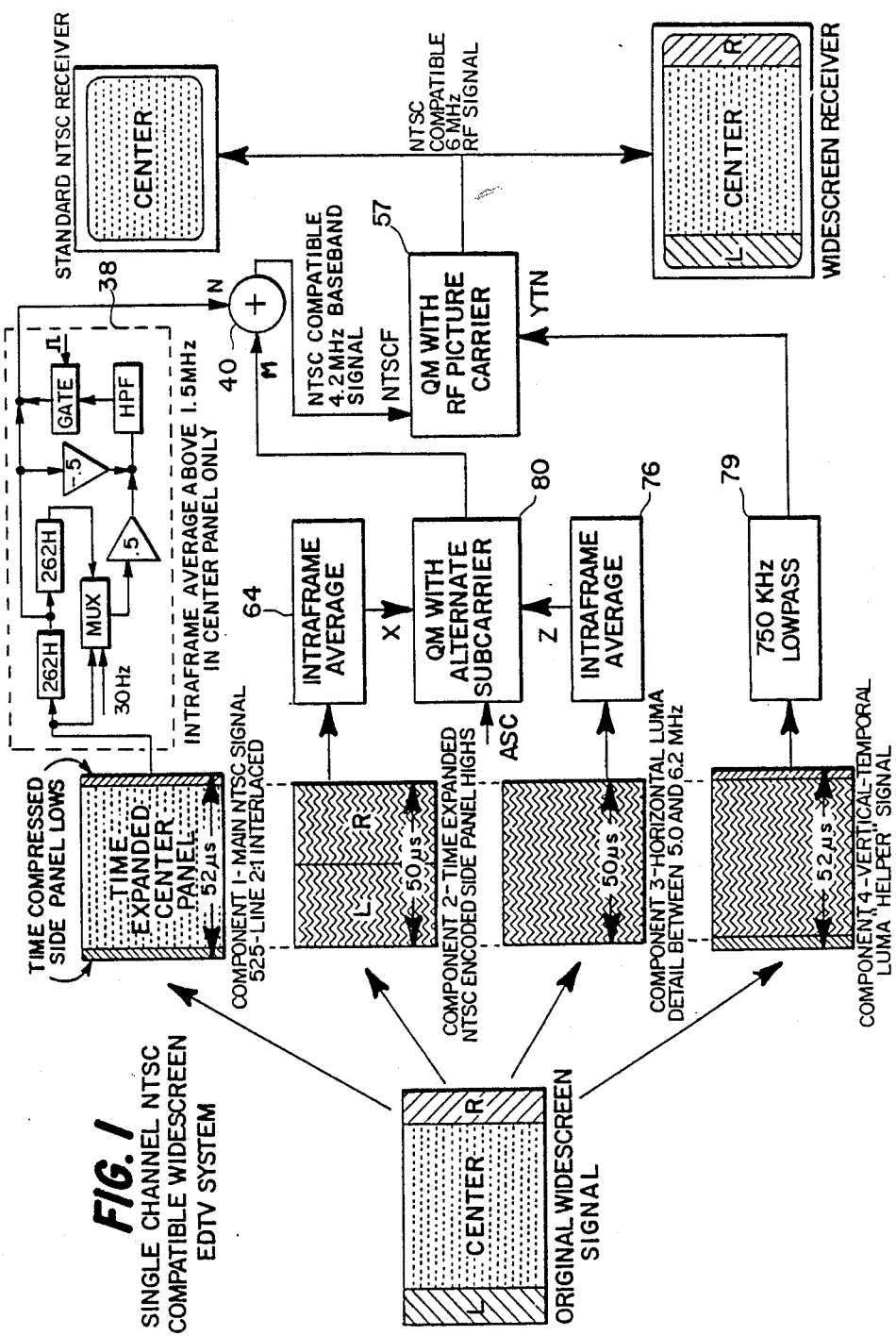
FIG. 1 illustrates a general overview of a compatible widescreen EDTV encoder system including intraframe processor apparatus in accordance with the present invention.
Figure 1A:
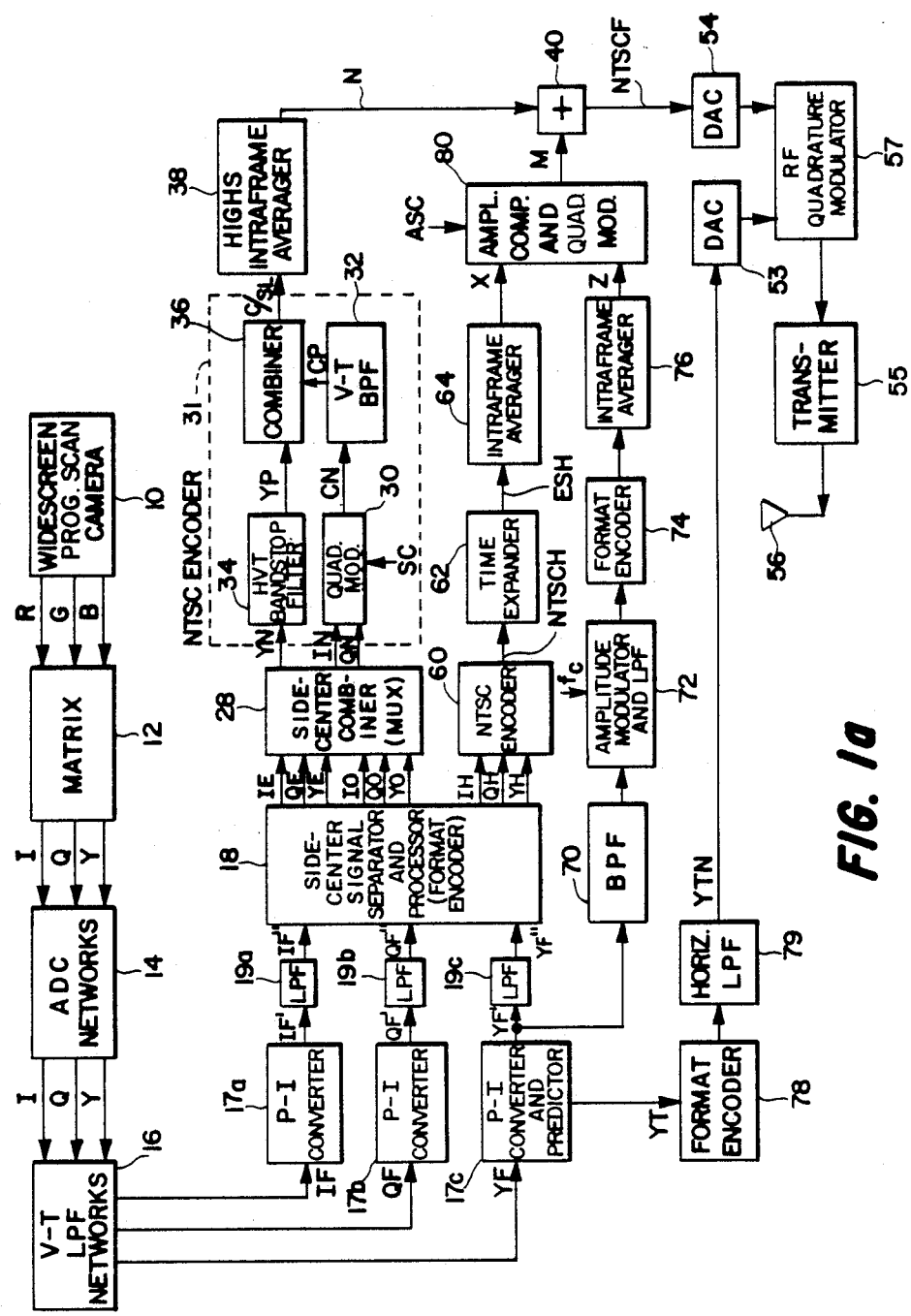
FIG. 1a shows a detailed block diagram of the encoder for the disclosed system.

In the system of FIG. 1, elements which are common to the more detailed system of FIG. 1a are identified by the same reference number. As shown in FIG. 1, an original widescreen progressive scan signal with left, right and center panel information is processed so as to develop four separate encoding components. These four components were described above, and are illustrated pictorially in FIG. 1. Processing of the first component (containing time expanded center portion information and time compressed side portion low frequency information) is such that the resulting luminance bandwidth does not exceed the NTSC luminance bandwidth of 4.2 MHz in this example. This signal is color encoded in standard NTSC format, and the luminance and chrominance components of this signal are suitably pre-filtered (e.g., using field comb filters) to provide improved luminance-chrominance separation at both standard NTSC and widescreen receivers.

The time expansion of the second component (side panel high frequency information) reduces its horizontal bandwidth to about 1.16 MHz. This component is spatially uncorrelated with the main signal (the first component), and special precautions are taken to mask its visibility on standard NTSC receivers, as will be discussed.

The 5.0 to 6.0 MHz extended high-frequency luminance information content of the third component is first shifted downward in frequency to a frequency range of 0 to 1.0 MHz before further processing.

The fourth component (temporal field difference helper) is mapped into standard 4:3 format to correlate it with the main signal component to thereby mask its visibility on standard NTSC receivers, and is horizontally bandwidth limited to 750 KHz.

As will be discussed in greater detail subsequently, the first, second, and third components are processed by respective intraframe averagers 38, 64, and 76 (a type of vertical-temporal (V-T) filter) to eliminate V-T crosstalk between the main and auxiliary signal components at a widescreen receiver. The center panel information of the first component is intra-frame averaged above approximately 1.5 MHz. The second and third intraframe averaged components, identified as X and Z, are non-linearly amplitude compressed prior to quadrature modulating a 3.108 MHz alternate subcarrier ASC, having a field alternating (inverting) phase, in a block 80. A modulated signal (M) from block 80 is added to the intraframe averaged first component (N) in an adder 40. A resulting output signal is a 4.2 MHz bandwidth baseband signal (NTSCF) that, together with a 750 KHz low pass filtered fourth component (YTN) from a filter 79, quadrature modulates an RF picture carrier in a block 57 to produce an NTSC compatible RF signal which can be transmitted to a standard NTSC receiver or a widescreen progressive scan receiver via a single, standard bandwidth, broadcast channel.

The use of time compression on the first component allows low frequency side panel information to be squeezed entirely into the horizontal overscan region of a standard NTSC signal. The high frequency side panel information of the second component and the high frequency luminance detail information of the third component are spectrally shared with the standard NTSC signal through the video transmission channel, in a manner transparent to a standard receiver, through the use of an alternate subcarrier quadrature modulation technique involving block 80 as will be discussed. When received by a standard NTSC receiver, only the center panel portion of the main signal (the first component) is seen. The second and third components may create a low amplitude interference pattern that is not perceived at normal viewing distances and at normal picture control settings. The fourth component is removed completely in receivers with synchronous video detectors. In receivers with envelope detectors, the fourth component is processed but not perceived because it is correlated with the main signal.

The main signal (component 1) exhibits a standard NTSC active horizontal line interval of approximately 52 microseconds (μs). Only high frequency information of this component above about 1.5 MHz is intraframe averaged. The time compressed side panel low frequency information of this component is not subjected to the process of intraframe averaging. It has been found that such selective intraframe processing of the main component improves the resolution of diagonal side panel image information by eliminating undesirable jagged diagonal artifacts, sometimes referred to as "jaggies", which would otherwise be produced in a reconstructed image if the compressed side panel information of the main signal were intraframe averaged.

In this regard it is noted that the side panel low frequency information of the main signal component has been time compressed with a side compression factor (SCF) of approximately six. If such time compressed information is intraframe averaged before being time expanded at the receiver for reconstructing the image, the reconstructed side panel image information would exhibit jagged diagonals because the horizontal frequency at which intraframe averaging began would then be approximately SCF times lower than for the center panel. Diagonal image information becomes increasingly distorted ("jagged") as the frequencies over which intraframe averaging is performed decrease. For example, if the main signal is intraframe averaged for frequencies above 1.5 MHz and the side panel low frequency information of component 1 is time compressed with an SCF of six, intraframe averaging of the side panel information effectively begins at a much lower frequency of 250 KHz (1.5 MHz/SCF), whereby jagged diagonals result. Thus jagged diagonals would be more noticeable in the reconstructed side panel regions. Since component 1 is not intraframe averaged in the time compressed side panel regions, the entire range of original frequencies in these regions (0–700 KHz) retains full vertical resolution without distortion due to jagged diagonal artifacts.

Component 2, containing the left and right side panel high frequency information, is mapped so that it occupies the same time period as the center panel portion of component 1. Thus the left and right side panel highs are time expanded to fill the entire center panel region whereby component 2 exhibits an active horizontal scanning interval of approximately 50 μs, which corresponds to the horizontal scanning interval of the center panel portion of component 1. For this portion the side panel expansion factor (SEF) is about 4.32, compared to an SEF of about 4.49 which would be required to expand the left and right side panel information of component 2 to the full active line time of 52 μs.

Both components 2 and 3 are mapped into the center panel region because of the intraframe processing performed on main component 1 and auxiliary components 2 and 3. As will be explained subsequently, intraframe averaging is a process which facilitates the separation of two previously combined signal components, such as main signal N and auxiliary modulated signal M in this example. Since the region of intraframe processing in component 1 has been reduced to encompass only the 50 μs center panel region, the mapping of modulating components 2 and 3 is similarly modified to encompass only the center panel region.

As mentioned above, component 3 is mapped so as to coincide with the center panel interval by linearly time compressing the extended horizontal luminance information to 50 μs. Time compressing component 3 from 52 μs to 50 μs sacrifices some spatial correlation with main component 1, but more importantly assures that the center and side panel regions of a reconstructed image will exhibit similar horizontal resolution. Although spatial correlation between components 1 and 3 is desirable to mask the effects of crosstalk between the alternate subcarrier and the main signal, the importance of maintaining perfect spatial correlation of component 3 is reduced because the alternate subcarrier already contains noncorrelated information in the form of component 2. The amount of spatial correlation given up in component 3 is negligible and is outweighed by the resulting similar center and side panel horizontal resolution. Component 4 is not intraframe averaged and remains unchanged, exhibiting a full 52 μs active line time consistent with the main signal.

In the decoder, as will be discussed in connection with FIG. 13, intraframe processing is performed only with respect to the center panel region for separating signals M and N. After demodulating component M into constituent components 2 and 3, components 2 and 3 are mapped into their original time slots, i.e., to occupy a full active line interval of 52 μs.

FIG. 1b illustrates the RF spectrum of the disclosed EDTV widescreen system, including the auxiliary information, compared to the RF spectrum of a standard NTSC system. In the spectrum of the disclosed system the side panel highs and the extra high frequency horizontal luminance detail information extend approximately 1.16 MHz on either side of the 3.108 MHz alternate subcarrier (ASC) frequency. The V-T helper signal information (component 4) extends 750 KHz on either side of the main signal picture carrier frequency.

A widescreen progressive scan receiver includes apparatus for reconstructing the original widescreen progressive scan signal. Compared to a standard NTSC signal, the reconstructed widescreen signal has left and right side panels with standard NTSC resolution, and a 4:3 aspect ratio center panel with superior horizontal and vertical luminance detail particularly in stationary portions of an image.

Two basic considerations govern the signal processing technique associated with the development and processing of the first, second, third, and fourth signal components. These considerations are compatibility with existing receivers, and recoverability at the receiver.

Full compatibility implies receiver and transmitter compatibility such that existing standard receivers can receive widescreen EDTV signals and produce a standard display without special adaptors. Compatibility in this sense requires, for example, that the transmitter image scanning format is substantially the same as, or within the tolerance of, the receiver image scanning format. Compatibility also means that extra non-standard components must be physically or perceptually hidden in the main signal when displayed on standard receivers. To achieve compatibility in the latter sense, the disclosed system uses the following techniques to hide the auxiliary components.

As discussed above, the side panel lows are physically hidden in the normal horizontal overscan region of a standard receiver. Component 2, which is a low-energy signal compared to the side panel lows component, and component 3, which is a normally low energy high frequency detail signal, are amplitude compressed and quadrature modulated onto an alternate subcarrier at 3.108 MHz, which is an interlaced frequency (an odd multiple of one-half the horizontal line rate). The frequency, phase, and amplitude of the alternate subcarrier are chosen so that the visibility of the modulated alternate subcarrier signal is reduced as much as possible, e.g., by controlling the phase of the alternate subcarrier from field to field so that it alternates 180° from one field to the next, unlike the phase of the chrominance subcarrier from one field to the next. Although the modulated alternate subcarrier components reside entirely within the chrominance passband (2.0-4.2 MHz), the modulated alternate subcarrier components are perceptually hidden because they are displayed as field rate complementary color flicker, which is not perceived by the human eye at normal levels of chrominance saturation. Also, nonlinear amplitude compression of the modulation components prior to amplitude modulation advantageously reduces instantaneous amplitude overshoots to an acceptable lower level. Component 3 is spatially correlated with respect to the central information portion of component 1 and is slightly less spatially correlated with respect to the left and right information portions of component 1. This is accomplished by means of format encoder as will be discussed.

Component 4, the "helper" signal, also is hidden by time expanding the center panel information to match the standard 4:3 format, thereby spatially correlating component 4 with the main signal. Component 4 is removed at standard receivers with synchronous detectors, and is perceptually hidden at standard receivers with envelope detectors because it is spatially correlated with the main signal.

Recovery of components 1, 2, and 3 at a widescreen progressive scan receiver is accomplished by utilizing a process of intraframe processing at the transmitter and receiver. This process is associated with elements 38, 64, and 76 in the transmitter system of FIGS. 1 and 1a, and with associated elements at the receiver as will be discussed. Intraframe averaging is one type of signal conditioning technique which prepares two visually correlated signals for mutual combining so that they can be recovered efficiently and accurately afterwards, such as by means of a field storage device, free from V-T (vertical-temporal) crosstalk even in the presence of motion in the case of image representative signals. The type of signal conditioning employed for this purpose essentially involves making two signals identical on a field basis, i.e., by obtaining two samples with identical values a field apart. Intraframe averaging is a convenient technique for achieving this objective, but other techniques can lso be used. Intraframe averaging is basically a linear, time varying digital pre-filtering and post-filtering process to ensure the accurate recovering of two visually correlated combined signals. Horizontal crosstalk is eliminated by guardbands between horizontal pre-filters at the transmitter encoder and post-filters at the receiver decoder.

Figure 1C:
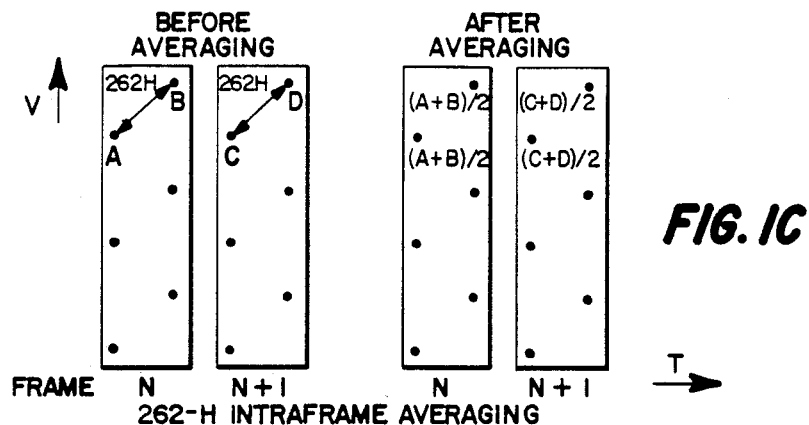
Figure 1D:
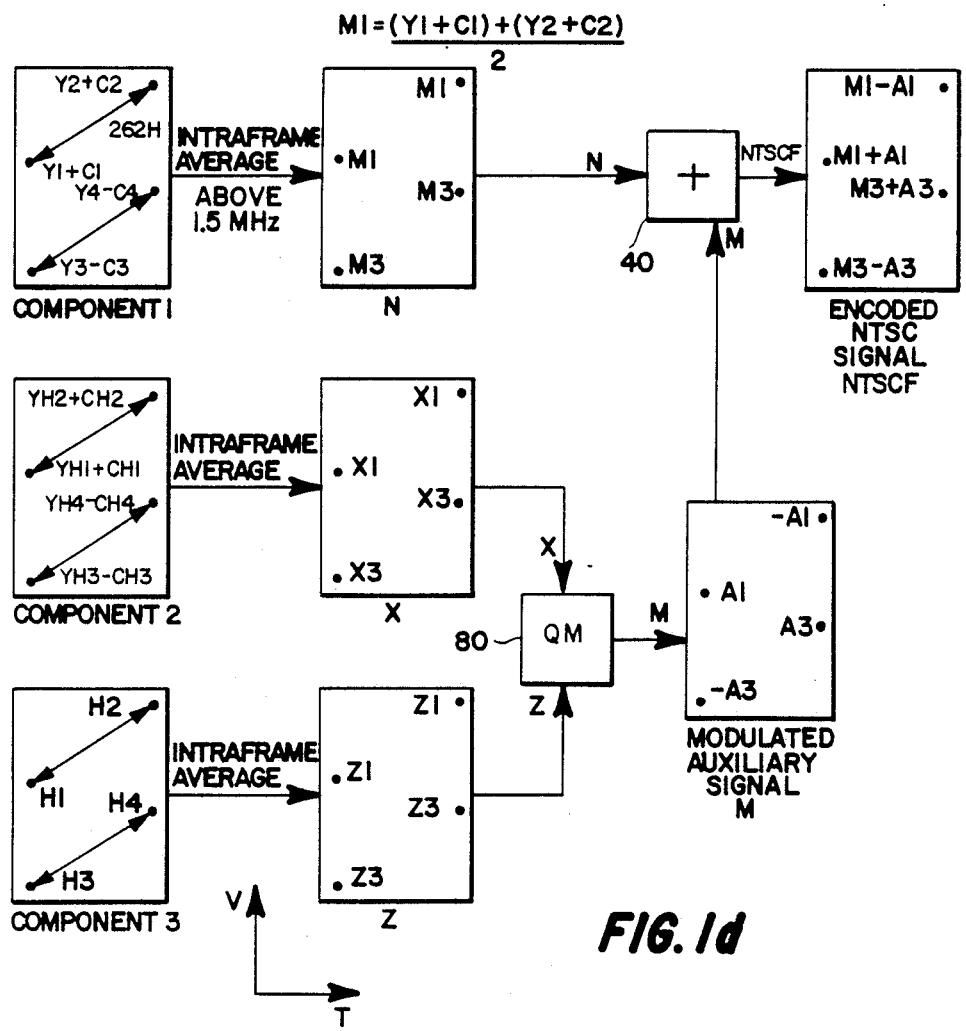

Intraframe averaging is a form of paired pixel processing. The process of intraframe averaging in the time domain is illustrated generally by FIG. 1c, wherein pairs of fields are made identical by averaging pixels (A, B and C,D) that are 262H apart. The average value replaces the original values in each pair. FIG. 1d illustrates the process of intraframe averaging in the context of the system of FIG. 1. Starting with components 2 and 3, pairs of pixels (picture elements) 262H apart within a frame are averaged, and the average value (e.g., X1, X3 and Z1, Z3) replaces the original pixel values. This V-T averaging occurs within a frame and does not cross frame boundaries. In the case of component 1, intraframe averaging is performed only on center panel information above approximately 1.5 MHz so as not to affect lower frequency vertical detail information. In the case of components 1 and 2, intraframe averaging is performed on a composite signal including luminance (y) and chrominance (c) components throughout the chrominance band. The chrominance component of the composite signal survives intraframe averaging because pixels 262H apart are "in-phase" with respect to the color subcarrier. The phase of the new alternate subcarrier is controlled so that it is exactly out of phase for pixels 262H apart, and is unlike the phase of the chrominance subcarrier. Thus when components 2 and 3 (after quadrature modulation) are added to component 1 in unit 40, pixels 262H apart have the form (M+A) and (M−A), where M is a sample of the main composite signal above 1.5 MHz, and A is a sample of the auxiliary modulated signal.

With intraframe averaging V-T crosstalk is virtually eliminated, even in the presence of motion. In this regard, the process of intraframe averaging produces identical samples 262H apart. At the receiver it is a simple matter to recover the information content of these samples exactly, i.e., free from crosstalk, by processing pixel samples 262H apart within a frame as will be discussed, thereby recovering main and auxiliary signal information. At a decoder in the receiver, the intraframe averaged original information can be recovered substantially intact via intraframe processing since the original highly visually correlated information has been made substantially identical field-to-field.

Also at the receiver, the RF channel is quadrature demodulated using a synchronous RF detector. Component 4 is thereby separated from the other three components. Intraframe processing is used to separate component 1 from modulated components 2 and 3, and quadrature demodulation is used to separate components 2 and 3, as will be discussed with regard to FIG. 13.

After the four components have been recovered, the composite signals are NTSC decoded and separated into luminance and chrominance components. Inverse mapping is performed on all components to recover the widescreen aspect ratio, and the side panel highs are combined with the lows to recover full side panel resolution. The extended high frequency luminance detail information is shifted to its original frequency range and added to the luminance signal, which is converted to the progressive scan format using temporal interpolation and the helper signal. The chrominance signal is converted to progressive scan format using unassisted temporal interpolation. Finally, the luminance and chrominance progressive scan signals are converted to analog form and matrixed to produce RGB color image signals for display by a widescreen progressive scan display device.

Figure 2:
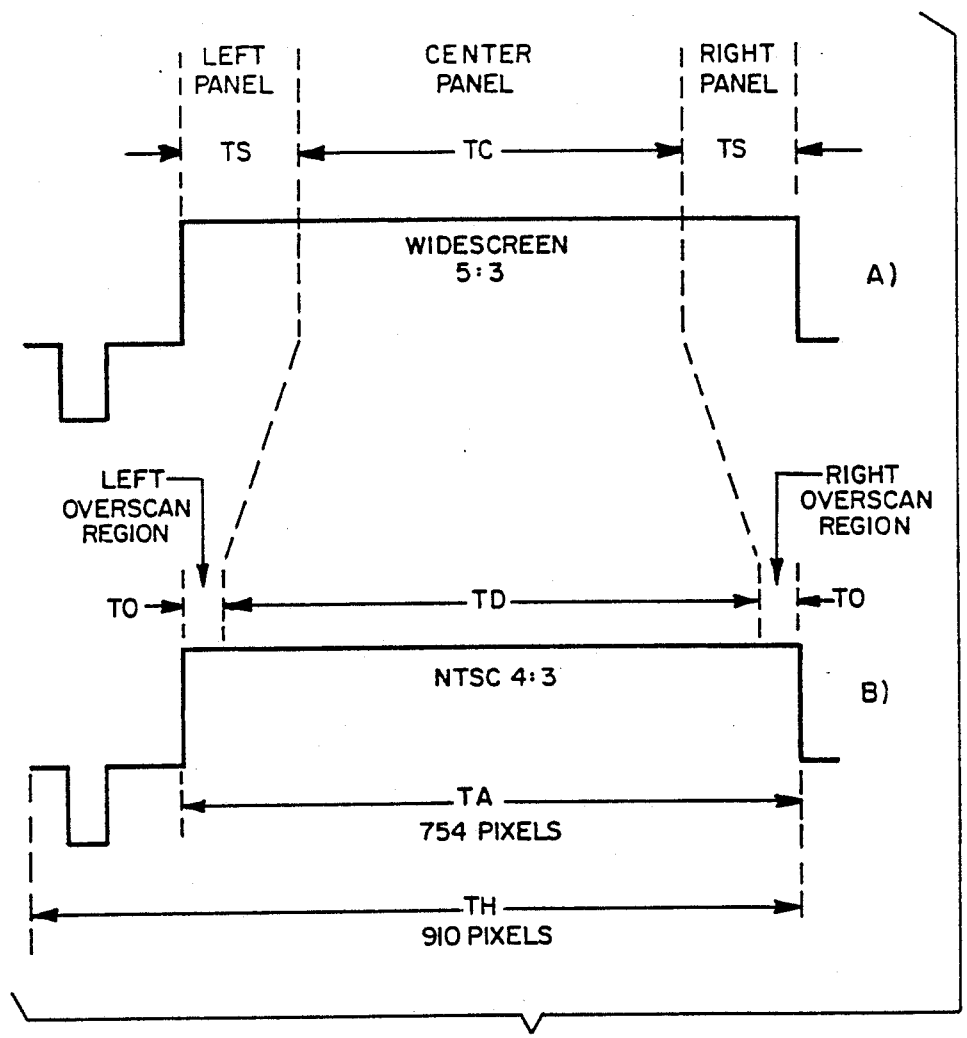
FIGS. 2–5 depict signal waveforms and diagrams helpful in understanding the operation of the disclosed system.

Before discussing the compatible widescreen encoding system of FIG. 1a, reference is made to signal waveforms A and B of FIG. 2. Signal A is a 5:3 aspect ratio widescreen signal that is to be converted to a standard NTSC compatible signal with a 4:3 aspect ratio as depicted by signal B. Widescreen signal A includes a center panel portion associated with primary image information occupying an interval TC, and left and right side panel portions associated with secondary image information and occupying intervals TS. In this example the left and right side panels exhibit substantially equal aspect ratios, less than that of the dominant center panel which is centered therebetween.

Widescreen signal A is converted to NTSC signal B by compressing certain side panel information completely into the horizontal overscan regions associated with time intervals TO. The standard NTSC signal has an active line interval TA (52.6 microseconds duration) which encompasses overscan intervals TO, a display time interval TD which contains the video information to be displayed, and a total horizontal line time interval TH of 63.556 microseconds duration. Intervals TA and TH are the same for both the widescreen and the standard NTSC signals. It has been found that almost all consumer television receivers have an overscan interval which occupies at least 4% of the total active line time TA, i.e., 2% overscan on the left and right sides. At an interlace sampling rate of 4×fsc (where fsc is the frequency of the color subcarrier), each horizontal line interval contains 910 pixels (picture elements) of which 754 constitute the active horizontal line image information to be displayed.

The widescreen EDTV system is shown in greater detail in FIG. 1a. Referring to FIG. 1a, a 525 line, 60 field/sec. widescreen progressive scan camera 10 provides a widescreen color signal with R, G, B components and a wide aspect ratio of 5:3 in this example. An interlaced signal source could also be used, but a progressive scan signal source produces superior results. A widescreen camera has a greater aspect ratio and a greater video bandwidth compared to a standard NTSC camera, the video bandwidth of a widescreen camera being proportional to the product of its aspect ratio and the total number of lines per frame, among other factors. Assuming constant velocity scanning by the widescreen camera, an increase in its aspect ratio causes a corresponding increase in its video bandwidth as well as horizontal compression of picture information when the signal is displayed by a standard television receiver with a 4:3 aspect ratio. For these reasons, it is necessary to modify the widescreen signal for full NTSC compatibility.

The color video signal processed by the encoder system of FIG. 1 contains both luminance and chrominance signal components. The luminance and chrominance signals contain both low and high frequency information, which in the following discussion will be referred to as "lows" and "highs", respectively.

The wide bandwidth widescreen progressive scan color video signals from camera 10 are matrixed in a unit 12 to derive luminance chrominance Y and color difference signal components I and Q from the R, G, B color signals. Wideband progressive scan signals Y, I, Q are sampled at an eight-times chrominance subcarrier rate (8×fsc), and are converted from analog to digital (binary) form individually by separate analog-to-digital converters (ADC) in an ADC unit 14 before being filtered individually by separate vertical-temporal (V-T) low pass filters in a filter unit 16 to produce filtered signals YF, IF and QF. These signals are each of the form indicated by waveform A in FIG. 2. The separate filters are 3×3 linear time invariant filters of the type shown in FIG. 10d as will be discussed. These filters reduce vertical-temporal resolution slightly, particularly diagonal V-T resolution, to prevent unwanted interlace artifacts (such as flicker, jagged edges, and other aliasing related effects) in the main signal (component 1 in FIG. 1) after progressive scan to interlace conversion. The filters maintain nearly full vertical resolution in stationary portions of the image.

The center panel expansion factor (CEF) is a function of the difference between the width of an image displayed by a widescreen receiver and the width of an image displayed by a standard receiver. The image width of a widescreen display with a 5:3 aspect ratio is 1.25 times greater than the image width of a standard display with a 4:3 aspect ratio. This factor of 1.25 is a preliminary center panel expansion factor which must be adjusted to account for the overscan region of a standard receiver, and to account for an intentional slight overlap of the boundary regions between the center and side panels as will be explained. These considerations dictate a CEF of 1.19.

The progressive scan signals from filter network 16 exhibit a bandwidth of 0–14.32 MHz and are respectively converted into 2:1 interlaced signals by means of progressive scan (P) to interlace (I) converters 17a, 17b and 17c, details of which will be discussed in connection with FIGS. 22 and 23. The bandwidth of output signals IF', QF' and YF' from converters 17a–17c exhibit a bandwidth of 0–7.16 MHz since the horizontal scanning rate for interlaced signals is half that of progressive scan signals. In the conversion process, the progressive scan signal is subsampled, taking half the available pixel samples to produce the 2:1 interlaced main signal. Specifically, each progressive scan signal is converted to 2:1 interlaced format by retaining either the odd or even lines in each field and reading out the retained pixels at a 4×fsc rate (14.32 MHz). All subsequent digital processing of the interlaced signals occurs at the 4×fsc rate.

Figure 2A:
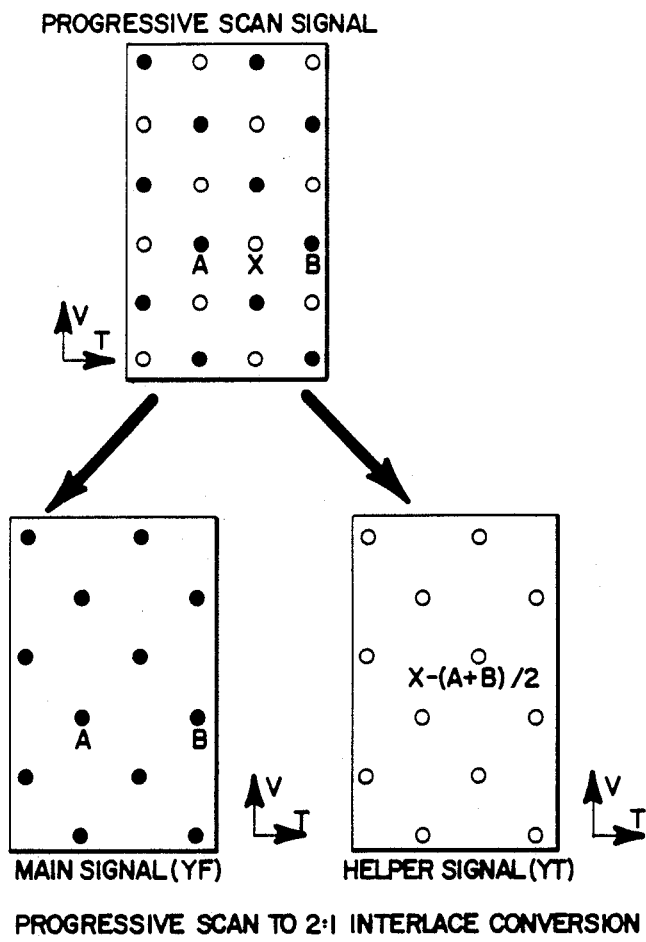

Network 17c also includes an error prediction network. One output of network 17c, YF', is the interlaced subsampled luminance version of the prefiltered progressive scan component. Another output (luminance) signal of network 17c, YT, comprises temporal information derived from image field difference information and represents a temporal prediction, or temporal interpolation, error between actual and predicted values of luminance samples "missing" at the receiver, as will be explained. The prediction is based on a temporal average of the amplitudes of "before" and "after" pixels, which are available at the receiver. Signal YT, a luminance "helper" signal that assists to reconstruct the progressive scan signal at the receiver, essentially accounts for an error that the receiver is expected to make with respect to non-stationary image signals and facilitates cancellation of such error at the receiver. In stationary portions of an image the error is zero, and perfect reconstruction is performed at the receiver. It has been found that a chrominance helper signal is not needed as a practical matter, and that a luminance helper signal is sufficient to produce good results since the human eye is less sensitive to a lack of chrominance vertical or temporal detail. FIG. 2a illustrates the algorithm used to develop helper signal YT.

Referring to FIG. 2a, pixels A, X, and B in the progressive scan signal occupy the same spatial position in an image. Black pixels such as A and B are transmitted as the main signal and are available at the receiver. A white pixel, such as X, is not transmitted and is predicted by a temporal frame average (A+B)/2. that is, at the encoder a prediction is made for "missing" pixel X by averaging the amplitudes of "before" and "after" pixels A and B. The prediction value, (A+B)/2, is subtracted from the actual value, X, to produce a prediction error signal, corresponding to the helper signal, with an amplitude in accordance with the expression $X-(A+B)/2$. This expression defines temporal field difference information in addition to temporal frame average information. The helper signal is lowpass filtered horizontally by means of a 750 KHz low pass filter and conveyed as helper signal YT. Bandlimiting of the helper signal to 750 KHz is necessary to prevent this signal from interfering with the next lower RF channel after this signal is modulated onto the RF picture subcarrier. At the receiver, a similar prediction of missing pixel X is made by using an average of samples A and B, and the prediction error is added to the prediction. That is, X is recovered by adding the prediction error $X-(A+B)/2$ to the temporal average $(A+B)/2$. Thus the helper signal facilitates the conversion from interlaced to progressive scan format.

The helper signal produced by the disclosed temporal prediction algorithm advantageously is a low energy signal compared to a prediction signal produced by some other algorithms, such as that used to produce a line differential signal as described by M. Tsinberg in an article "ENTSC Two-Channel Compatible HDTV System", *IEEE Transactions on Consumer Electronics*, Vol. CE-33, No. 3, August 1987, pp. 146-153. In still areas of an image, the error energy is zero because the prediction is perfect. A low energy condition is manifested by still and substantially still images (such as a news broadcast featuring a reporter against a still background). The disclosed algorithm has been found to produce the least objectionable artifacts after image reconstruction at the receiver, and the helper signal produced by the disclosed algorithm retains its usefulness after being bandlimited (filtered) to about 750 KHz. The helper signal produced by the disclosed algorithm advantageously exhibits zero energy in the presence of still image information, and consequently a helper signal associated with a still image is unaffected by filtering. A highly improved reconstructed widescreen image results even if the helper signal is not transmitted. In such case still portions of the image will be much sharper than a standard NTSC image, but moving portions will be somewhat "softer" and may exhibit a "beat" artifact. Thus a broadcaster need not transmit the helper signal initially, but can choose to upgrade the RF transmission at a later time.

The disclosed temporal prediction system is useful for both progressive scan and interlaced systems with higher than standard line rates, but works best with a progressive scan source having pixels A, X and B occupying the same spatial position in an image, which results in a perfect prediction for still images. The temporal prediction will be imperfect even in still portions of an image if the original widescreen image comes from an interlaced signal source. In such case the helper signal will have more energy and will introduce slight artifacts in still portions of a reconstructed image. Experiments have shown that the use of an interlaced signal source yields acceptable results with artifacts being noticeable only upon close inspection, but that a progressive scan signal source introduces fewer artifacts and produces preferred results.

Figure 6:
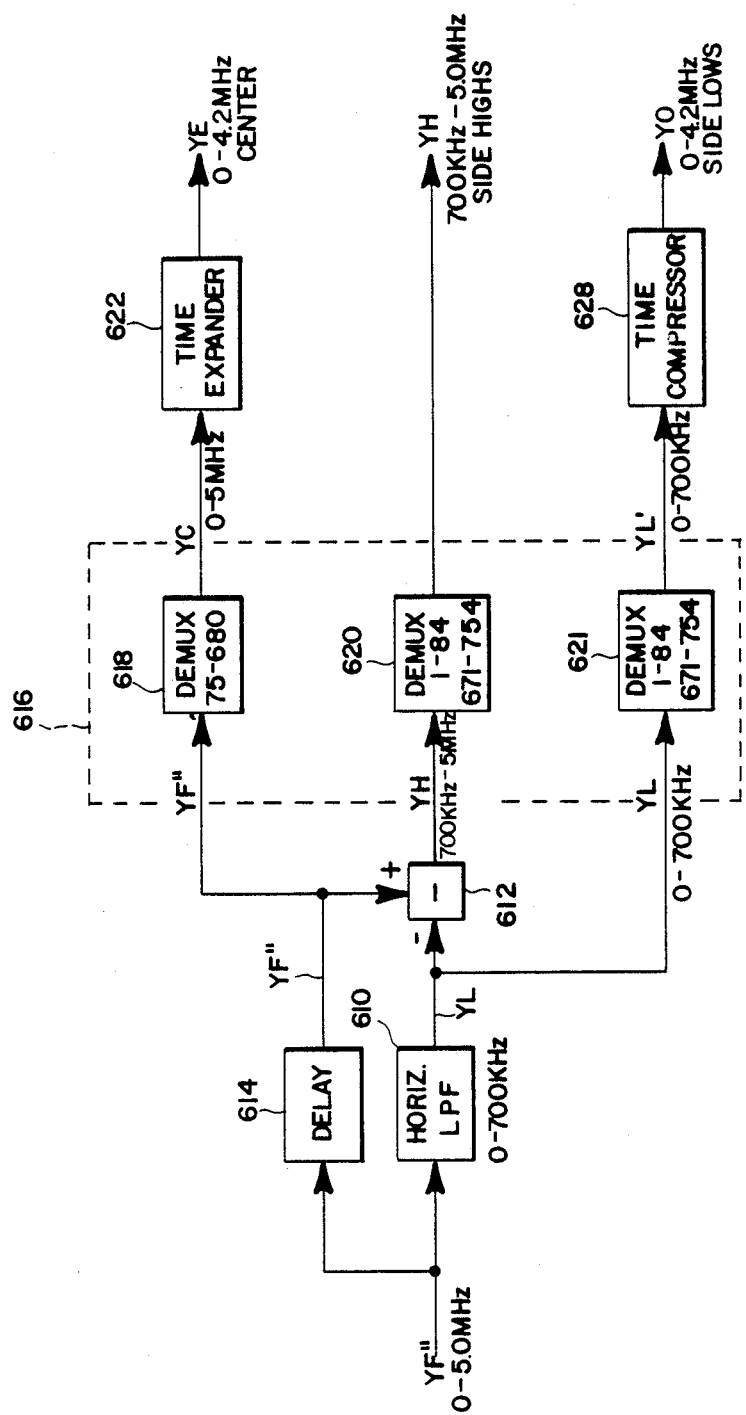
Figure 7:
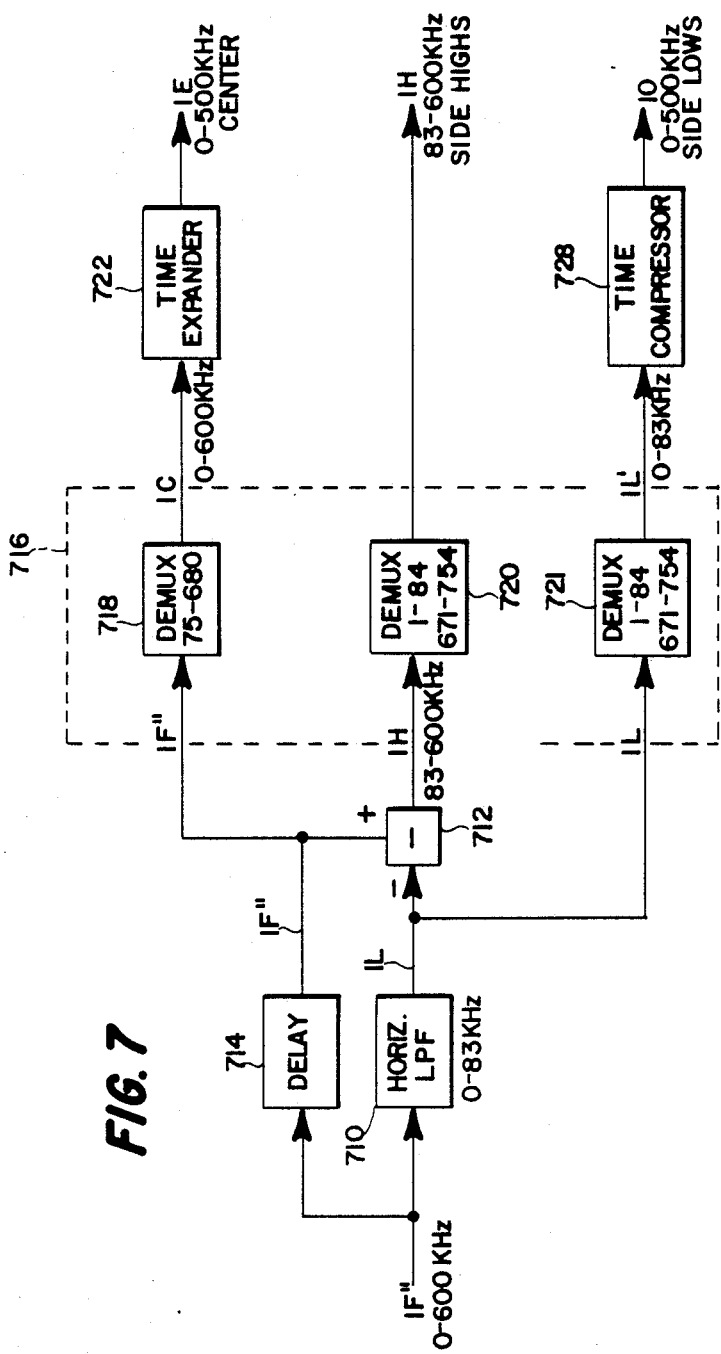

Returning to FIG. 1a, interlaced widescreen signals IF', QF' and YF' from converters 17a-17c are respectively filtered by horizontal lowpass filters 19a, 19b and 19c to produce a signal IF" with a bandwidth of 0-600 KHz, a signal QF" with a bandwidth of 0-600 KHz, and a signal YF" with a bandwidth of 0-5 MHz. These signals are next subjected to a format encoding process which encodes each of these signals into a 4:3 format by means of format encoding apparatus associated with a side-center signal separator and processor unit 18. Briefly, the center portion of each widescreen line is time-expanded and mapped into the displayed portion of the active line time with a 4:3 aspect ratio. Time expansion causes a decrease in bandwidth so that the original widescreen interlaced frequencies are made compatible with the standard NTSC bandwidth. The side panels are split into horizontal frequency bands so that the I and Q color highs component exhibit a bandwidth of 83 KHz-600 KHz (as shown for signal IH in FIG. 7) and the Y luminance highs component exhibits a bandwidth of 700 KHz-5.0 MHz (as shown for signal YH in FIG. 6). The side panel lows, i.e., signals YO, IO and QO developed as shown in FIGS. 6 and 7, include a DC component and are time-compressed and mapped into the left and right horizontal image overscan regions on each line. The side panel highs are processed separately. Details of this format encoding process follow immediately below.

Figure 1E:
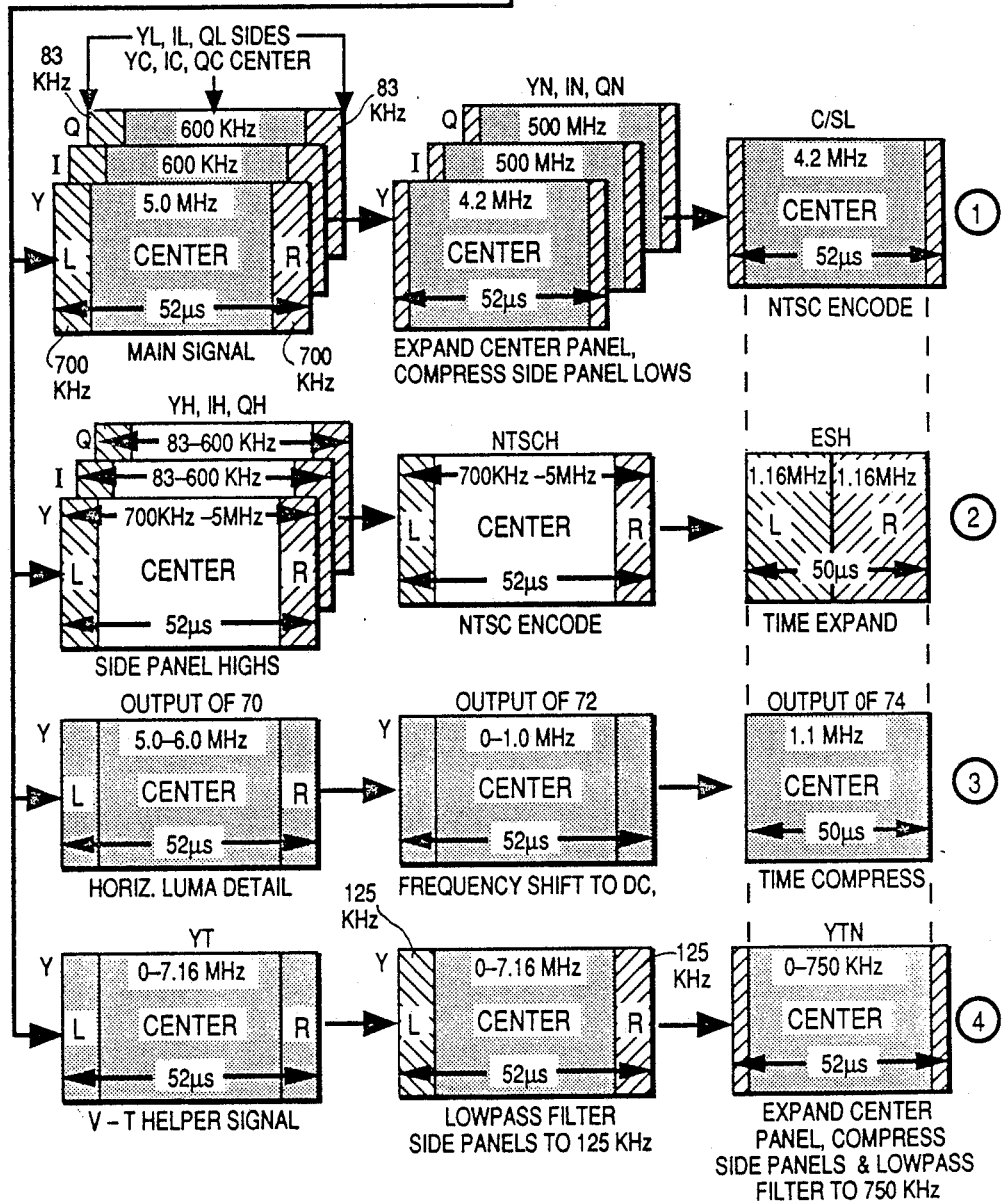

In the course of considering the following encoding details, it will be helpful to also consider FIG. 1e, which depicts the process of encoding components 1, 2, 3 and 4 in the context of displayed center and side panel information. Filtered interlaced signals IF", QF" and YF" are processed by side-center panel signal separator and processor 18 to produce three groups of output signals: YE, IE and QE, YO, IO and Q0; and YH, IH and QH. The first two groups of signals (YE, IE, QE and YO, IO, QO) are processed to develop a signal containing a full bandwidth center panel component, and side panel luminance lows compressed into horizontal overscan regions. The third group of signals (YH, IH, QH) is processed to develop a signal containing side panel highs. When these signals are combined, an NTSC compatible widescreen signal with a 4:3 display aspect ratio is produced. Details of circuits comprising unit 18 will be shown and discussed in connection with FIGS. 6, 7 and 8.

Figure 3:
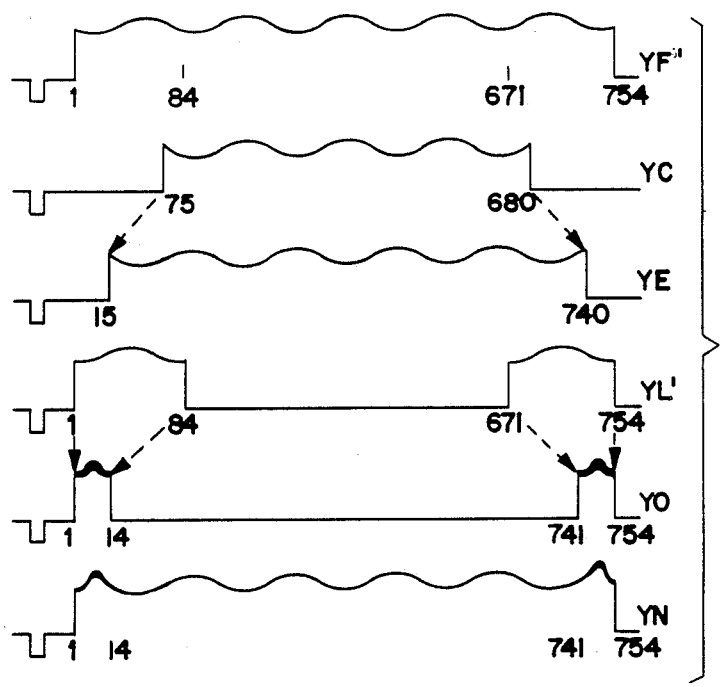

Signals YE, IE and QE contain complete center panel information and exhibit the same format, as indicated by signal YE in FIG. 3. Briefly, signal YE is derived from signal YF" as follows. Widescreen signal YF" contains pixels 1-754 occuring during the active line interval of the widescreen signal, containing side and center panel information. The wideband center panel information (pixels 75-680) is extracted as a center panel luminance signal YC via a time de-multiplexing process. Signal YC is time expanded by the center panel expansion factor of 1.19 (i.e., 5.0 MHz÷4.2 MHz) to produce NTSC compatible center panel signal YE. Signal YE exhibits an NTSC compatible bandwidth (0-4.2 MHz) due to the time expansion by factor 1.19. Signal YE occupies picture display interval TD (FIG. 2) between overscan regions TO. Signals YE and QE are developed from signals IF" and QF", respectively, and are similarly processed in the manner of signal YE.

Signals YO, IO and QO provide the low frequency side panel information ("lows") which is inserted into the left and right horizontal overscan regions. Signals YO, IO and QO exhibit the same format, as indicated by signal YO in FIG. 3. Briefly, signal YO is derived from signal YF" as follows. Widescreen signal YF" contains left panel information associated with pixels 1-84 and right panel information associated with pixels 671-754. As will be discussed, signal YF" is low pass filtered to produce a luminance lows signal with a 0–700 KHz bandwidth, from which signal a left and right side panel lows signal is extracted (signal YL' in FIG. 3) via a time de-multiplexing process. Luminance lows signal YL' is time compressed to produce side panel lows signal YO with compressed low frequency information in the overscan regions associated with pixels 1–14 and 741–754. The compressed side lows signal exhibits an increased BW proportional to the amount of time compression. Signals IO and QO are developed from signals IF'' and QF'' respectively, and are similarly processed in the manner of signal YO.

Signals YE, IE, QE and YO, IO, QO are combined by a side-center signal combiner 28, e.g. a time multiplexer, to produce signals YN, IN and QN with an NTSC compatible bandwidth and a 4:3 aspect ratio. These signals are of the form of signal YN shown in FIG. 3. Combiner 28 also includes appropriate signal delays for equalizing the transit times of the signals being combined. Such equalizing signal delays are also included elsewhere in the system as required to equalize signal transit times.

A modulator 30, bandpass filter 32, H-V-T bandstop filter 34 and combiner 36 constitute an improved NTSC signal encoder 31. Chrominance signals IN and QN are quadrature modulated on a subcarrier SC at the NTSC chrominance subcarrier frequency, nominally 3.58 MHz, by modulator 30 to produce a modulated signal CN. Modulator 30 is of conventional design and will be described in connection with FIG. 9. Modulated signal CN is bandpass filtered in the vertical (V) and temporal (T) dimensions by means of two-dimensional (V-T) filter 32, which removes crosstalk artifacts in the interlaced chrominance signal before it is applied to a chrominance signal input of combiner 36 as a signal CP. Luminance signal YN is bandstop filtered in the horizontal (H), vertical (V) and temporal (T) dimensions by means of three-dimensional H-V-T bandstop filter 34 before being applied, as a signal YP, to a luminance input of combiner 36. Filtering luminance signal YN and chrominance color difference signals IN and QN serves to assure that luminance-chrominance crosstalk will be significantly reduced after subsequent NTSC encoding. Multi-dimensional spatial-temporal filters such as H-V-T filter 34 and V-T filter 32 in FIG. 1 comprise structure as illustrated by FIG. 10 which will be discussed subsequently.

H-V-T bandstop filter 34 in FIG. 1a exhibits the configuration of FIG. 10b, and removes upwardly moving diagonal frequency components from luminance signal YN. These frequency components are similar in appearance to chrominance subcarrier components and are removed to make a hole in the frequency spectrum into which modulated chrominance will be inserted. The removal of the upwardly moving diagonal frequency components from luminance signal YN does not visibly degrade a displayed picture because it has been determined that the human eye is substantially insensitive to these frequency components. Filter 34 exhibits a cut-off frequency of approximately 1.5 MHz so as not to impair luminance vertical detail information.

V-T bandpass filter 32 reduces the chrominance bandwidth so that modulated chrominance side panel information can be inserted into the hole created in the luminance spectrum by filter 34. Filter 32 reduces the vertical and temporal resolution of chrominance information such that static and moving edges are slightly blurred, but this effect is of little or no consequence due to the insensitivity of the human eye to such effect.

Figure 4:
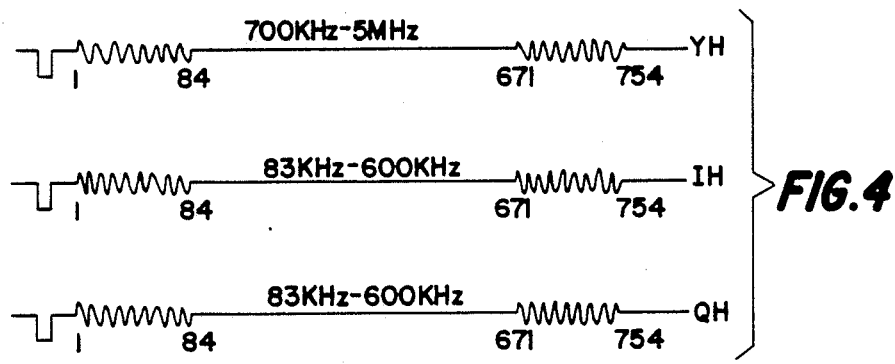
Figure 8:
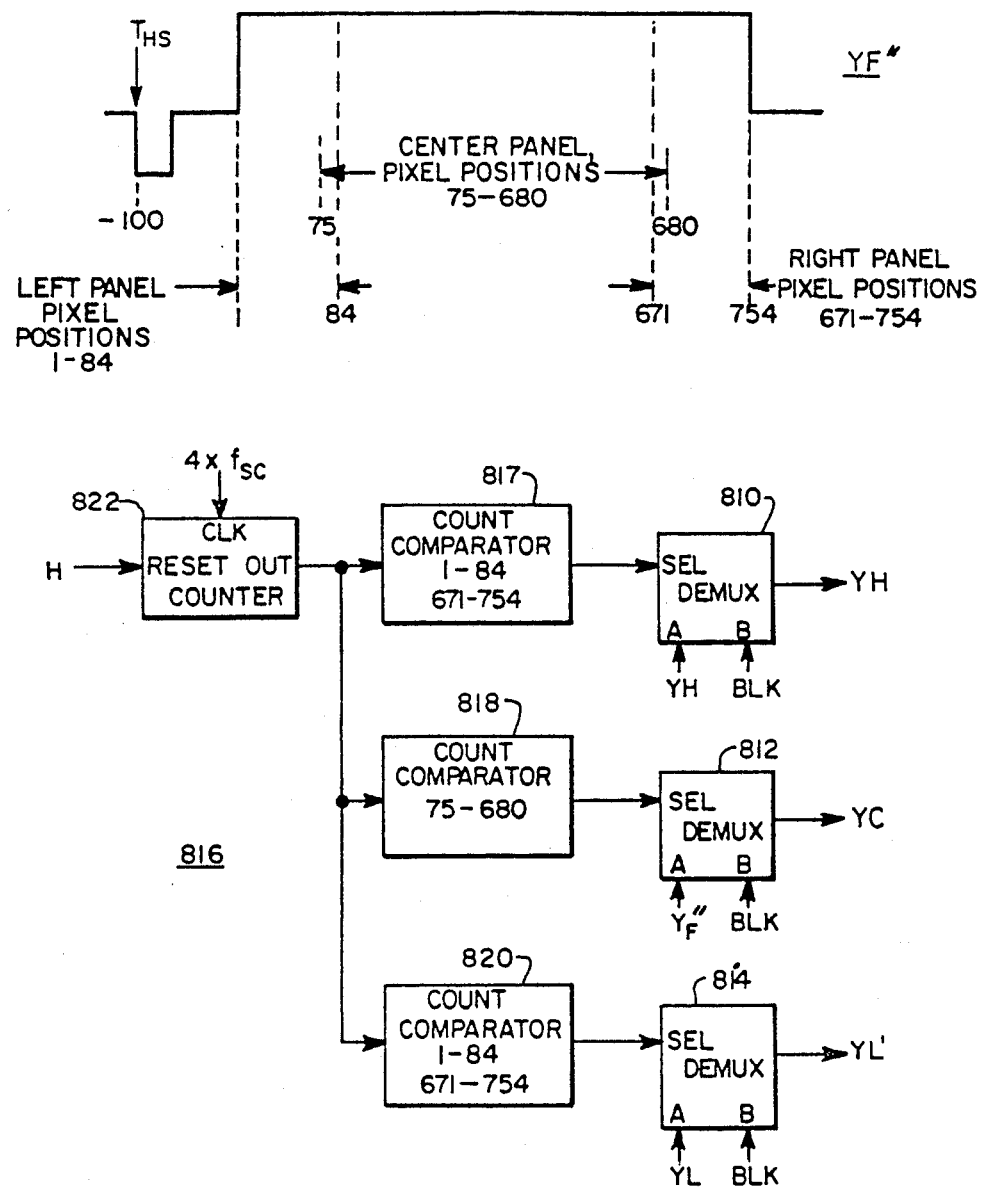

An output center/side lows signal C/SL from combiner 36 contains NTSC compatible information to be displayed, as derived from the center panel of the widescreen signal, as well as compressed side panel lows (both luminance and chrominance) derived from the side panels of the widescreen signal and situated in the left and right horizontal overscan regions not seen by a viewer of an NTSC receiver display. The compressed side panel lows in the overscan region represent one constituent part of the side panel information for a widescreen display. The other constituent part, the side panel highs, is developed by processor 18 as will be discussed below. Side panel high signals YH (luminance highs), IH (I highs) and QH (Q highs) are illustrated by FIG. 4. FIGS. 6, 7 and 8 illustrate apparatus for developing these signals, as will be discussed. In FIG. 4, signals YH, IH and QH contain left panel high frequency information associated with left panel pixels 1–84, and right panel high frequency information associated with right panel pixels 671–754.

The center panel portion of signal C/SL is processed by an intraframe averager 38 to produce a signal N, which is applied to an input of an adder 40. Intraframe averaged signal N is essentially identical to signal C/SL because of the high visual correlation of intraframe image information of signal C/SL. Averager 38 averages signal C/SL above approximately 1.5 MHz and assists to reduce or eliminate vertical-temporal crosstalk between the main and auxiliary signals. The highpass frequency range of 1.5 MHz and above over which intraframe averager 38 operates was chosen to assure that full intraframe averaging is accomplished for information at 2 MHz and above, to prevent luminance vertical detail information from being degraded by the process of intraframe averaging. Horizontal crosstalk is eliminated by means of a 200 KHz guardband between a filter associated with intraframe averager 38 in encoder 31 and a filter associated with an intraframe processor unit in the decoder of FIG. 13. FIG. 11b shows details of highs intraframe averager 38. FIGS. 11b and 13 will be discussed subsequently.

Figure 5:
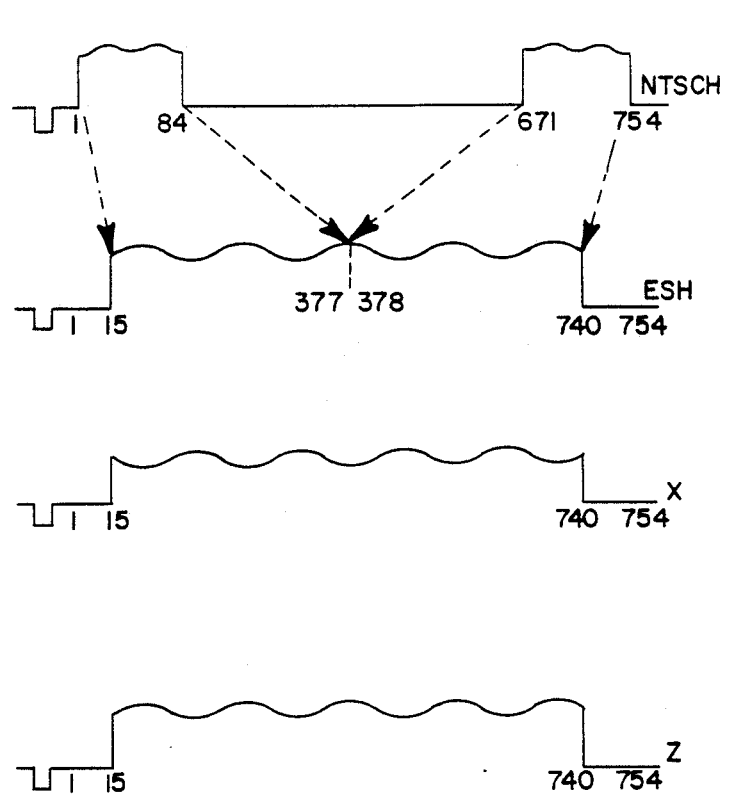

Signals IH, QH, and YH are placed in NTSC format by means of an NTSC encoder 60 which is similar to encoder 31. Specifically, encoder 60 includes apparatus of the type shown in FIG. 9, as well as apparatus for quadrature modulating side panel chrominance highs information onto the side panel luminance highs information at 3.58 MHz, to produce signal NTSCH, the side panel highs information in NTSC format. This signal is illustrated by FIG. 5.

The use of multi-dimensional bandpass filtering in NTSC encoders 31 and 60 advantageously permits the luminance and chrominance components to be separated virtually free of crosstalk at the receiver when the receiver includes complementary multi-dimensional filtering for separating the luminance and chrominance information. The use of complementary filters for luminance/chrominance encoding and decoding is called cooperative processing and is discussed in detail in an article by C. H. Strolle titled "Cooperative Processing for Improved Chrominance/Luminance Separation", published in the *SMPTE Journal*, Vol. 95, No. 8, August 1986, pp. 782–789. Even standard receivers using conventional notch and line-comb filters will benefit from the use of such multi-dimensional pre-filtering at the encoder by exhibiting reduced chrominance/luminance crosstalk.

Signal NTSCH is time expanded by a unit 62 to produce an expanded side highs signal ESH with a 50 μs active horizontal line interval, i.e., less than the standard NTSC active line interval of approximately 52 μs. Specifically, as shown in FIG. 5, the expansion is accomplished by a "mapping" process which maps left side panel pixels 1-84 of signal NTSCH into pixel positions 15-377 of signal ESH, i.e., the left side highs of signal NTSCH are expanded to occupy approximately one half the line time of signal ESH. The right side panel portion (pixels 671-754) of signal NTSCH is similarly processed. The time expansion process reduces the horizontal bandwidth of the information comprising signal ESH (compared to that of signal NTSCH) by a factor of 363/84. The mapping process by which time expansion is accomplished can be realized by apparatus of the type shown and to be discussed in connection with FIGS. 12-12d. Signal ESH is intra-frame averaged by a network 64, of the type shown in FIG. 11a, to produce a signal X as illustrated in FIG. 5. Intraframe averaged signal X is essentially identical to signal ESH because of the high visual correlation of intraframe image information of signal ESH. Signal X is applied to a signal input of a quadrature modulator 80.

Signal YF' is also filtered by a horizontal bandpass filter 70 with a passband of 5 MHz–6.0 MHz. The output signal from filter 70, horizontal luminance highs, is applied to an amplitude modulator 72 where it amplitude modulates at 5 MHz carrier signal $f_c$. Modulator 72 includes an output low pass filter with a cut-off frequency of approximately 1.0 MHz to obtain a signal with a 0–1.0 MHz passband at the output of modulator 72. The upper (aliased) sideband (5.0–6.0 MHz) produced by the modulation process is removed by the 1.0 MHz lowpass filter. Effectively, horizontal luminance highs frequencies in the range 5.0 MHz–6.0 MHz have been shifted to the range 0–1.0 MHz as a result of the amplitude modulation process and subsequent low pass filtering. The carrier amplitude should be large enough so that the original signal amplitudes are retained after filtering by the 1.0 MHz low pass filter. That is, a frequency shift without affecting amplitude is produced.

The frequency-shifted horizontal luminance highs signal from unit 72 is encoded (time compressed) by means of a format encoder 74. That is, encoder 74 encodes the frequency shifted horizontal luminance highs so that this signal exhibits an active line interval of 50 μs, less than the standard NTSC active line interval of 52.6 μs, by using techniques that will be discussed in connection with FIGS. 6-8. When the input signal to encoder 74 is time compressed by encoder 74, its bandwidth increases from approximately 1.0 MHz to 1.1 MHz at the output of encoder 74. The signal from encoder 74 is intraframe averaged by means of apparatus 76 similar to that illustrated in FIG. 11a, before being applied to unit 80 as signal Z. Intraframe averaged signal Z is essentially identical to the signal from encoder 74 because of the high visual correlation of intraframe image information of the signal from encoder 74. Modulating signal X, a composite signal containing luminance and chrominance information, and modulating signal Z exhibit substantially the same bandwidth, approximately 0–1.1 MHz.

As will be discussed in connection with FIG. 24, unit 80 performs nonlinear gamma function amplitude compression on large amplitude excursions of the two auxiliary signals, X and Z, before these signals quadrature modulate on alternate subcarrier signal ASC. A gamma of 0.7 is used, whereby the absolute value of each sample is raised to the 0.7 power and multiplied by the sign of the original sample value. Gamma compression reduces the visibility of potentially interfering large amplitude excursions of the modulated signals on exisiting receivers, and allows predictable recovery at the widescreen receiver since the inverse of the gamma function employed at the encoder is predictable and can be readily implemented at the receiver decoder.

The amplitude compressed signals are then quadrature modulated on a 3.1075 MHz phase-controlled alternate subcarrier ASC, which is an odd multiple of one half the horizontal line frequency (395×H/2). The phase of the alternate subcarrier is caused to alternate 180° from one field to the next, unlike the phase of the chrominance subcarrier. The field alternating phase of the alternate subcarrier permits the auxiliary modulating information of signals X and Z to overlap chrominance information and produces complementary phased auxiliary information components A1, −A1 and A3, −A3 of the modulated auxiliary signal, which facilitates the separation of the auxiliary information using a relatively uncomplicated field storage device at the receiver. The quadrature modulated signal, M, is added to signal N in adder 40. The resulting signal, NTSCF, is a 4.2 MHz NTSC compatible signal.

The described non-linear gamma function employed in the encoder for the purpose of large amplitude compression is a constituent part of a non-linear companding (compression-expansion) system which also includes a complementary gamma function in the decoder of a widescreen receiver for the purpose of amplitude expansion, as will be discussed subsequently. The disclosed non-linear companding system has been found to significantly reduce the impact of auxiliary non-standard information upon the standard information, without causing visible degradation of an image due to noise effects. The companding system uses a non-linear gamma function to instantaneously compress large amplitude excursions of auxiliary, non-standard widescreen high frequency information at the encoder, with a complementary non-linear gamma function being used to correspondingly expand such high frequency information at the decoder. The result is a reduction in the amount of interference with existing standard video information caused by large amplitude auxiliary high frequency information, in the disclosed compatible widescreen system wherein non-standard auxiliary widescreen information is split into low and high frequency portions subjected to companding. At the decoder, non-linear amplitude expansion of the compressed high frequency information does not result in excessive perceived noise since large amplitude high frequency information is typically associated with high contrast image edges, and the human eye is insensitive to noise at such edges. The described companding process also advantageously reduces cross-modulation products between the alternate and chrominance subcarriers, with associated reduction in visible beat products.

Luminance detail signal YT exhibits a bandwidth of 7.16 MHz and is encoded into the 4:3 format by means of a format encoder 78 (e.g., in the manner shown in FIG. 6), and is horizontally lowpass filtered to 750 KHz by a filter 79 to produce a signal YTN. The side portions are lowpass filtered to 125 KHz before time compression by means of an input lowpass filter of format encoder 78, corresponding to input filter 610 of the apparatus shown in FIG. 6 but with a cut-off frequency of 125 KHz. The side portion highs are discarded. Thus signal YTN is spatially correlated with main signal C/SL.

Signals YTN and NTSCF are converted from digital (binary) to analog form by means of DAC units 53 and 54 respectively, before these signals are applied to an RF quadrature modulator 57 for modulating a TV RF carrier signal. The RF modulated signal is afterwards applied to a transmitter 55 for broadcast via an antenna 56.

Alternate subcarrier ASC associated with modulator 80 is horizontally synchronized and has a frequency chosen to insure adequate separation (e.g., 20–30 db.) of side and center information, and to have insignificant impact upon an image displayed by a standard NTSC receiver. The ASC frequency preferably should be an interlace frequency at an odd multiple of one half the horizontal line rate so as not to produce interference which would compromise the quality of a displayed picture.

Quadrature modulation such as provided by unit 80 advantageously permits two narrowband signals to be transmitted simultaneously. Time expanding the modulating highs signals results in a bandwidth reduction, consistent with the narrowband requirements of quadrature modulation. The more the bandwidth is reduced, the less likely it is that interference between the carrier and modulating signals will result. Furthermore, the typically high energy DC component of the side panel information is compressed into the overscan region rather than being used as a modulating signal. Thus the energy of the modulating signal, and therefore the potential interference of the modulating signal, are greatly reduced.

The encoded NTSC compatible widescreen signal broadcast by antenna 56 is intended to be received by both NTSC receivers and widescreen receivers, as illustrated by FIG. 13.

In FIG. 13, a broadcast compatible widescreen EDTV interlaced television signal is received by an antenna 1310 and applied to an antenna input of an NTSC receiver 1312. Receiver 1312 processes the compatible widescreen signal in normal fashion to produce an image display with a 4:3 aspect ratio, with the widescreen side panel information being in part compressed (i.e., "lows") into the horizontal overscan regions out of sight of the viewer, and being in part (i.e., "highs") contained in the modulated alternate subcarrier signal which does not disrupt the standard receiver operation.

The compatible widescreen EDTV signal received by antenna 1310 is also applied to a widescreen progressive scan receiver 1320 capable of displaying a video image with a wide aspect ratio of, e.g., 5:3. The received widescreen signal is processed by an input unit 1322 including radio frequency (RF) tuner and amplifier circuits, and synchronous video demodulator (a quadrature demodulator) which produces a baseband video signal, and analog-to-digital (ADC) converter circuits for producing a baseband video signal (NTSCF) in binary form. The ADC circuits operate at a sampling rate of four times the chrominance subcarrier frequency (4×fsc).

Signal NTSCF is applied to an intraframe processor 1324 which processes image lines 262H apart within frames, above 1.7 MHz, to recover main signal N and quadrature modulated auxiliary signal M substantially free from V-T crosstalk. A 200 KHz horizontal crosstalk guardband is provided between the 1.7 MHz lower limit operating frequency of unit 1324 and the 1.5 MHz lower limit operating frequency of unit 38 in the encoder of FIG. 1a. Recovered signal N contains information which is essentially visually identical to image information of main signal C/SL, due to the high visual intraframe image correlation of original main signal C/SL as intraframe averaged in the encoder of FIG. 1a.

Signal M is coupled to a quadrature demodulator and amplitude expander unit 1326 for demodulating auxiliary signals X and Z in response to an alternate subcarrier ASC with a field alternating phase, similar to signal ASC discussed in connection with FIG. 1a. Demodulated signals X and Z contain information which is essentially visually identical to image information of signal ESH and of the output signal from unit 74 in FIG. 1a, due to the high visual intraframe image correlation of these signals as intraframe averaged by the encoder of FIG. 1a. Unit 1326 also includes a 1.5 MHz lowpass filter to remove unwanted high frequency demodulation products at twice the alternate subcarrier frequency, and an amplitude expander for expanding the (previously compressed) demodulated signals using an inverse-gamma function (gamma=1/0.7=1.429), i.e., the inverse of the non-linear compression function performed by unit 80 in FIG. 1a.

A unit 1328 time compresses the color encoded side panel highs so that they occupy their original time slots, thereby recovering signal NTSCH. Unit 1328 time compresses signal NTSCH by the same amount that unit 62 of FIG. 1a time expanded signal NTSCH.

Figure 17:
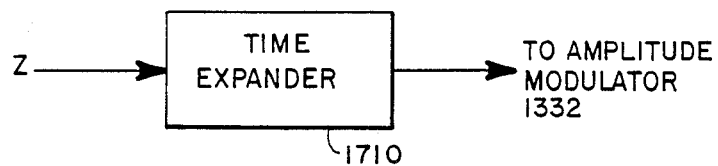

A luminance (Y) highs decoder 1330 decodes luminance horizontal highs signal Z into widescreen format by time expanding this signal by the same amount as time compression of the corresponding component in the encoder of FIG. 1a, as indicated by FIG. 17, using mapping techniques described herein.

Modulator 1332 amplitude modulates the signal from decoder 1330 on a 5.0 MHz carrier $f_c$. The amplitude modulated signal is afterwards high pass filtered by a filter 1334 with a 5.0 Mhz cut-off frequency to remove the lower sideband. In the output signal from filter 1334, center panel frequencies of 5.0 to 6.0 MHz are recovered, and side panel frequencies of 5.0 to 6.0 MHz are recovered. The signal from filter 1334 is applied to an adder 1336.

Signal NTSCH from compressor 1328 is applied to a unit 1340 for separating the luminance highs from the chrominance highs to produce signals YH, IH and QH. This can be accomplished by the arrangement of FIG. 18.

Figure 18:
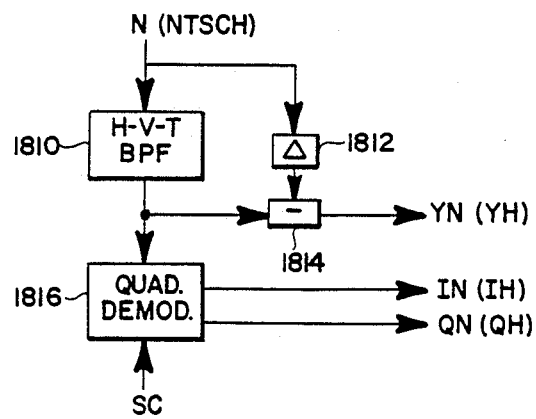

Signal N from unit 1324 is separated into its constituent luminance and chrominance components YN, IN and QN by means of a luminance-chrominance separator 1342 which can be similar to separator 1340 and which can employ apparatus of the type shown in FIG. 18.

Figure 19:
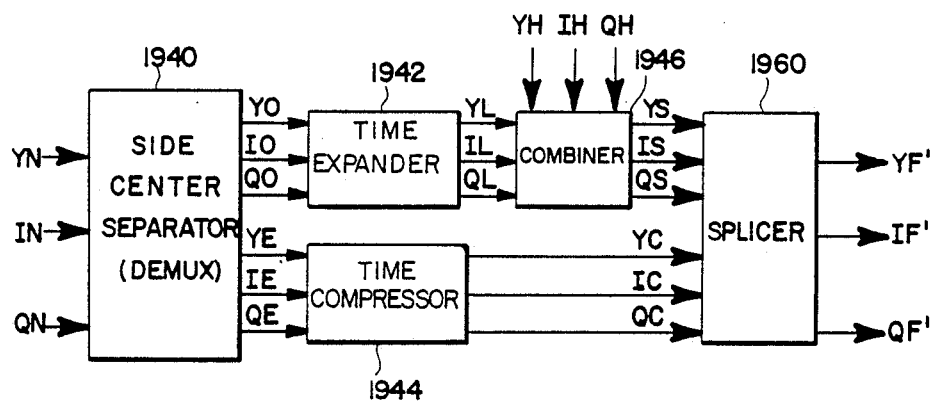

Signals YH, IH, QH and YN, IN, QN are provided as inputs to a Y-I-Q format decoder 1344, which decodes the luminance and chrominance components into widescreen format. The side panel lows are time expanded, the center panel is time compressed, the side panel highs are added to the side panel lows, and the side panels are spliced to the center panel in the 10-pixel overlap region using the principles of FIG. 14. Details of decoder 1344 are shown in FIG. 19.

Signal YF' is coupled to adder 1336 where it is summed with the signal from filter 1334. By this process recovered extended high frequency horizontal luminance detail information is added to decoded luminance signal YF'.

Signals YF', IF' and QF' are converted from interlaced to progressive scan format by means of converters 1350, 1352 and 1354, respectively. Luminance progressive scan converter 1350 also responds to "helper" luminance signal YT from a format decoder 1360, which decodes encoded "helper" signal YTN. Decoder 1360 decodes signal YTN into widescreen format, and exhibits a configuration similar to that of FIG. 17.

I and Q converters 1352 and 1354 convert interlace to progressive scan signals by temporally averaging lines one frame apart to produce the missing progressive scan line information. This can be accomplished by apparatus of the type shown in FIG. 20.

Luminance progressive scan converter unit 1350 is similar to that shown in FIG. 20, except that signal YT is added as shown by the arrangement of FIG. 21. In this unit a "helper" signal sample, YT, is added to a temporal average to assist reconstructing a missing progressive scan pixel sample. Full temporal detail is recovered within the band of horizontal frequencies contained in the encoded line difference signal (750 KHz, after encoding). Above this band of horizontal frequencies signal YT is zero, so the missing sample is reconstructed by temporal averaging.

Widescreen progressive scan signals YF, IF and QF are converted to analog form by means of a digital-to-analog converter 1362 before being applied to a video signal processor and matrix amplifier unit 1364. The video signal processor component of unit 1364 includes signal amplifying, DC level shifting, peaking, brightness control, contrast control and other conventional video signal processing circuits. Matrix amplifier 1364 combines luminance signal YF with color difference signals IF and QF to produce color image representative video signals R, G and B. These color signals are amplified by display driver amplifiers in unit 1364 to a level suitable for directly driving a widescreen color image display device 1370, e.g. a widescreen kinescope.

FIG. 6 illustrates apparatus included in processor 18 of FIG. 1a for developing signals YE, YO, and YH from wideband widescreen signal YF. Signal YF" is horizontally low pass filtered by an input filter 610 with a cutoff frequency of 700 KHz to produce low frequency luminance signal YL, which is applied to one input of a subtractive combiner 612. Signal YF" is applied to another input of combiner 612 and to time de-multiplexing apparatus 616 after being delayed by a unit 614 to compensate for the signal processing delay of filter 610. Combining delayed signal YF" and filtered signal YL produces high frequency luminance signal YH at the output of combiner 612.

Delayed signal YF" and signals YH and YL are applied to separate inputs of de-multiplexing apparatus 616, which includes de-multiplexing (DEMUX) units 618, 620 and 621 for respectively processing signals YF", YH and YL. The details of de-multiplexing apparatus 616 will be discussed in connection with FIG. 8. De-multiplexing units 618, 620 and 621 respectively derive full bandwidth center panel signal YC, side panel highs signal YH and side panel lows signal YL' as illustrated in FIGS. 3 and 4.

Signal YC is time expanded by a time expander 622 to produce signal YE. Signal YC is time expanded with a center expansion factor sufficient to leave room for the left and right horizontal overscan regions. The center expansion factor (1.19) is the ratio of the intended width of signal YE (pixels 15-740) to the width of signal YC (pixels 75-680) as shown in FIG. 3.

Signal YL' is compressed with a side compression factor by a time compressor 628 to produce signal YO. The side compression factor (6.0) is the ratio of the width of the corresponding portion of signal YL' (e.g. left pixels 1-84) to the intended width of signal YO (e.g. left pixels 1-14) as shown in FIG. 3. Time expanders 622, 624 and 626 and time compressor 628 can be of the type shown in FIG. 12, as will be discussed.

Signals IE, IH, IO and QE, QH, QO are respectively developed from signals IF" and QF" in a manner similar to that by which signals YE, YH and YO are developed by the apparatus of FIG. 6. In this regard reference is made to FIG. 7, which illustrates apparatus for developing signals IE, IH and IO from signal IF". Signals QE, QH and QO are developed from signal QF" in a similar manner.

In FIG. 7, wideband widescreen signal IF", after being delayed by a unit 714, is coupled to de-multiplexing apparatus 716 and is also subtractively combined with low frequency signal IL from a low pass filter 710 in a subtractive combiner 712 to produce high frequency signal IH. Delayed signal IF" and signals IH and IL are respectively de-multiplexed by de-multiplexers 718, 720 and 721 associated with de-multiplexing apparatus 716 to produce signals IC, IH and IL'. Signal IC is time expanded by an expander 722 to produce signal IE, and signal IL' is time compressed by a compressor 728 to produce signal IO. Signal IC is expanded with a center expansion factor similar to that employed for signal YC as discussed, and signal IL' is compressed with a side compression factor similar to that employed for signal YL', also as discussed.

FIG. 8 illustrates a de-multiplexing apparatus 816 such as can be used for apparatus 616 of FIG. 6 and 716 of FIG. 7. The apparatus of FIG. 8 is illustrated in the context of de-multiplexer 616 of FIG. 6. Input signal YF" contains 754 pixels defining the image information. Pixels 1-84 define the left panel, pixels 671-754 define the right panel, and pixels 75-680 define the center panel which overlaps the left and right panels slightly. Signals IF" and QF" exhibit similar overlap. As will be discussed, such panel overlap has been found to facilitate combining (splicing) the center and side panels at the receiver to substantially eliminate boundary artifacts.

De-multiplexing apparatus 816 includes first, second and third de-multiplexer (DEMUX) units 810, 812 and 814 respectively associated with left, center and right panel information. Each de-multiplexer unit has an input "A" to which signals YH, YF" and YL are respectively applied, and an input "B" to which a blanking signal (BLK) is applied. The blanking signal may be a logic 0 level or ground, for example. Unit 810 extracts output signal YH, containing the left and right highs, from input signal YH as long as a signal select input (SEL) of unit 810 receives a first control signal from a count comparator 817 indicating the presence of left panel pixel elements 1-84 and right panel pixel elements 671-754. At other times, a second control signal from count comparator 817 causes the BLK signal at input B rather than signal YH at input A to be coupled to the output of unit 810. Unit 814 and a count comparator 820 operate in a similar fashion for deriving side panel lows signal YL' from signal YL. Unit 812 couples signal YF" from its input A to its output to produce center panel signal YC only when a control signal from a count comparator 818 indicates the presence of center panel pixels 75-680.

Count comparators 817, 818 and 820 are synchronized to video signal YF" by means of a pulse output signal from a counter 822 which responds to a clock signal at four times the chrominance subcarrier frequency (4×fsc), and to a horizontal line synchronizing signal H derived from video signal YF". Each output pulse from counter 822 corresponds to a pixel position along a horizontal line. Counter 822 exhibits an initial offset of a −100 count corresponding to the 100 pixels from the beginning of the negative going horizontal sync pulse at time $T_{HS}$ to the end of the horizontal blanking interval, at which time pixel 1 appears at the onset of the horizontal line display interval. Thus counter 822 exhibits a count of "1" at the onset of the line display interval. Other counter arrangements can also be developed. The principles employed by de-multiplexing apparatus 816 can also be applied to multiplexing apparatus for performing a converse signal combining operation, such as is performed by side-center panel combiner 28 in FIG. 1a.

FIG. 9 shows details of modulator 30 in encoders 31 and 60 of FIG. 1a. In FIG. 9, signals IN and QN appear at a four times chrominance subcarrier rate (4×fsc) and are applied to signal inputs of latches 910 and 912, respectively. Latches 910 and 912 also receive 4×fsc clock signals to transfer in signals IN and QN, and a 2×fsc switching signal which is applied to an inverting switching signal input of latch 910 and to a noninverting switching signal input of latch 912. Signal outputs of latches 910 and 912 are combined into a single output line at which signals I and Q appear alternately and are applied to signal inputs of a noninverting latch 914 and an inverting latch 916. These latches are clocked at a 4×fsc rate and receive a switching signal, at the chrominance subcarrier frequency fsc, at inverting and noninverting inputs respectively. Noninverting latch 914 produces an output alternating sequence of positive polarity signals I and Q, and inverting latch 916 produces an output alternating sequence of negative polarity I and Q signals, i.e. −I, −Q. The outputs of latches 914 and 916 are combined in a single output line on which appears an alternating sequence of paired I and Q signals of mutually opposite polarity pairs, i.e., I, Q, −I, −Q . . . etc., constituting signal CN. This signal is filtered by filter 32 before being combined in unit 36 with a filtered version of luminance signal YN to produce NTSC encoded signal C/SL of the form Y+I, Y+Q, Y−I, Y−Q, Y+I, Y+Q . . . and so on.

FIG. 10 illustrates a vertical-temporal (V-T) filter which can exhibit V-T bandpass, V-T bandstop or V-T low pass configurations by adjusting weighting coefficients a1-a9. The table of FIG. 10a illustrates the weighting coefficients associated with V-T bandpass and bandstop filter configurations which are employed in the disclosed system. An H-V-T bandstop filter such as filter 34 of FIG. 1a, and H-V-T bandpass filters such as are included in the decoder system of FIG. 13, respectively comprise the combination of a horizontal lowpass filter 1020 and a V-T bandstop filter 1021 as shown in FIG. 10b, and the combination of a horizontal bandpass filter 1030 and a V-T bandpass filter 1031 as shown in FIG. 10C.

In the H-V-T bandstop filter of FIG. 10b, horizontal lowpass filter 1020 exhibits a given cut-off frequency and provides a filtered low frequency signal component. This signal is subtractively combined in a combiner 1023 with a delayed version of the input signal from a delay unit 1022 to produce a high frequency signal component. The low frequency component is subjected to a one frame delay by means of a network 1024 before being applied to a n additive combiner 1025 for providing an H-V-T bandstop filtered output signal. V-T filter 1021 exhibits the V-T bandstop filter coefficients shown in FIG. 10a. An H-V-T bandpass filter such as included in the decoder of FIG. 13 is shown in FIG. 10c as comprising a horizontal bandpass filter 1030 having a given cut-off frequency, cascaded with a V-T bandpass filter 1031 having V-T bandpass filter coefficients as indicated by the table of FIG. 10a.

The filter of FIG. 10 includes a plurality of cascaded memory units (M) 1010a-1010h for providing successive signal delays at respective taps t1-t9, and for providing an overall filter delay. Signals conveyed by the taps are respectively applied to one input of multipliers 1012a-1012i. Another input of each of the multipliers respectively receives a prescribed weighting a1-a9 depending on the nature of the filtering process to be performed. The nature of the filtering process also dictates the delays imparted by memory units 1010a-1010h. Horizontal dimension filters employ pixel storage memory elements such that the overall filter delay is less than the time interval of one horizontal image line (1H). Vertical dimension filters employ line storage memory elements exclusively, and temporal dimension filters employ frame storage memory elements exclusively. Thus an H-V-T 3-D filter comprises a combination of pixel, (<1H), line (1H) and frame (>1H) storage elements, while a V-T filter comprises only the latter two types of memory elements. Weighted tapped (mutually delayed) signals from elements 1012a-1012i are combined in an adder 1015 to produce a filtered output signal.

Such filters are non-recursive, finite impulse response (FIR) filters. The nature of the delay provided by the memory elements depends on the type of signal being filtered and the amount of crosstalk that can be tolerated between the luminance, chrominance and side panel highs signals in this example. The sharpness of the filter cutoff characteristics is enhanced by increasing the number of cascaded memory elements.

Figure 10D:
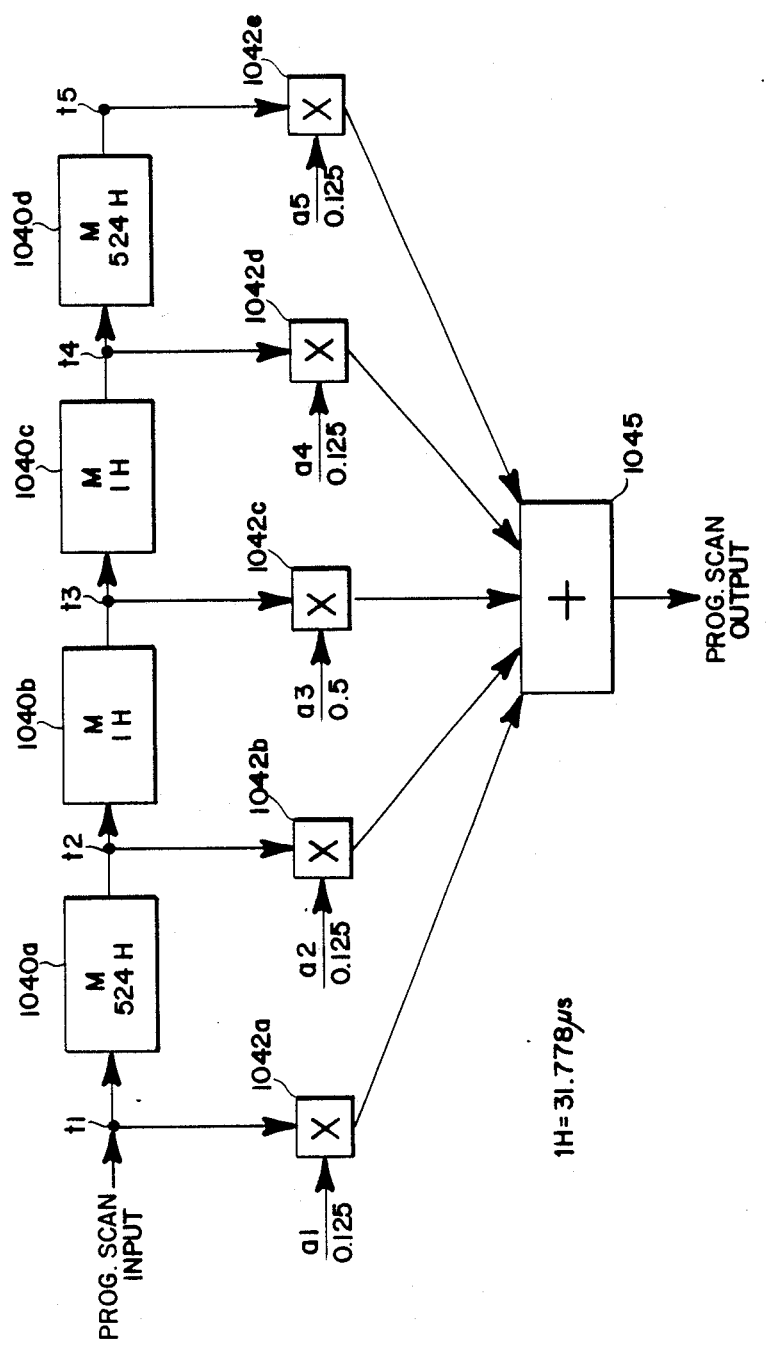

FIG. 10d illustrates one of the separate filters of network 16 in FIG. 1a, including cascaded memory (delay) units 1040a-1040d, associated multipliers 1042a-1042e with designated respective weighting factors a1-a5 for receiving signals from signal taps t1-t5, and a signal combiner 1045 which sums the weighted output signals from multipliers a1-a5 to produce an output signal.

FIG. 11a depicts an intraframe averager suitable for use as intraframe averagers 64 and 76 of FIG. 1a. An input composite video signal is applied to a delay network including 262H delay elements 1110 and 1112, and also to one input of a multiplexer (MUX) 1115 which is switched at the field rate in response to a 30 Hz switching signal. The 30 Hz MUX switching signal is vertically synchronized in response to vertical interval sync pulses associated with the input composite video signal. Another input of MUX 1115 receives a signal from an output of delay element 1112. A combiner 1118 additively combines output signals from MUX 1115 and from a center tap point between delay elements 1110 and 1112, after these signals have been weighted by an averaging factor of ½. This weighting factor can be provided by means of suitable matrixing networks within combiner 1118, or by means of signal multipliers situated in the input signal paths of combiner 1118, respectively.

Signals "Y1+C1" and "Y2+C2" are composite color video signals 262H apart in successive first and second image fields, and signal "M1" is an intraframe averaged output signal, as shown in FIG. 1d for example. During a first field, multiplexer 1115 is in input position "1" and conveys signal Y2+C2 to combiner 1118, where it is summed with center tap signal Y1+C1 to produce average output signal M1. In the next field the center tap between delay elements 1110 and 1112 contains signal value Y2+C2 and MUX 1115 is in position "2" for selecting the signal path from the output of delay element 1112, which contains signal value Y1+C1, thereby yielding the same average value of signal M1 from the output of combiner 1118. The described apparatus produces identical pixel pairs 262H apart, and is not limited to using an averaging process. Any weighting values may be used to produce a desired weighted combination of pixel pairs, and delays other than 262H may be used (along with an associated change in the MUX switching rate), depending on the requirements of a particular system.

FIG. 11b illustrates a frequency selective intraframe averager suitable for use as intraframe averager 38 of FIG. 1a. FIG. 11b includes the arrangement of FIG. 11a, except that subtractive rather than additive signal combination is associated with a combiner 1128, and in that a filter 1130, gate 1132 and combiner 1134 are included. Briefly, the output of combiner 1128 is representative of a difference between image fields, rather than an average as in the arrangement of FIG. 11a. This difference is essentially a cancellation term which is added back to signal Y1+C1 via combiner 1134 for cancelling differences between successive image fields to insure that the contents of successive image fields are identically averaged. Filter 1130 filters the cancellation term from the output of combiner 1128 to restrict the averaging process to a desired frequency range. Gate 1132 is controlled to determine when the averaging process occurs over an image interval, in this case over the center panel region exclusive of the time compressed side panel regions.

More specifically, the input signal paths to combiner 1128 exhibit signal weighting coefficients of +½ and −½ as shown so that the output signal from combiner 1128 corresponds to the difference in the information content of the input signals to combiner 1128, which are 262H apart in time in adjacent fields. The complementary weighting coefficients can be provided by employing signal multipliers in the respective input paths of combiner 1128, or by arranging combiner 1128 as a differing amplifier. The output signal from combiner 1128 is filtered by 1.5 MHz horizontal high pass filter 1130 before being applied to an electronic transmission gate 1132. Gate 1132 responds to a switching control signal for passing the high frequency signal from the output of filter 1130 only during the center portion of the main signal (component 1). At this time gate 1132 is open (conductive). Gate 1132 is closed (nonconductive) during the time compressed side panel portions of the main signal, e.g., during the illustrated positive pulse intervals of the control signal. The output signal from gate 1132 is summed in a combiner 1134 with the composite video signal appearing at the center tap point between delay elements 1120 and 1122. The gate control signal is vertically synchronized in response to vertical interval sync pulses associated with the input composite video signal. The gate control signal is also horizontally synchronized. Horizontal sync can be achieved by means responsive to the horizontal line synchronizing pulse component of the input composite video signal and including a pixel counter to determine the timing of the positive pulse components of the gate control signal following each horizontal line synchronizing pulse. A predetermined time interval can readily be established between a horizontal line sync pulse and the first image pixel.

Again referring to FIG. 1d together with FIG. 11b, when MUX 1125 is in position 1 as shown and gate 1132 is closed, only composite video signal Y1+C1 from the center tap between elements 1120 and 1122 appears at the output of combiner 1134. Thus at this time, the output signal of combiner 1134 is unaltered compressed side panel information of composite video signal Y1+C1 associated with field 1. The output signal of combiner 1134 is unaltered compressed side panel information of composite video signal Y2+C2 associated with a successive image field 2 when MUX 1125 occupies position 2.

When MUX 1125 is in position 1 for field 1 and gate 1132 is closed during the center panel interval between side panel intervals, the output signal from combiner 1134 contains signal components Y1+C1 and M1. Component Y1+C1 contains unaltered, i.e., not intraframe averaged, center panel information at and below approximately 1.5 MHz. Component M1 contains intraframe averaged center panel information above approximately 1.5 MHz. When MUX 1125 is in position 2 during succeeding field 2 and gate 1132 is closed during the center panel interval, the output signal from combiner 1134 contains intraframe averaged component M1 as discussed above, and component Y2+C2. The latter component contains unaltered (nonintraframe averaged) center panel information at and below approximately 1.5 MHz.

Figure 12:
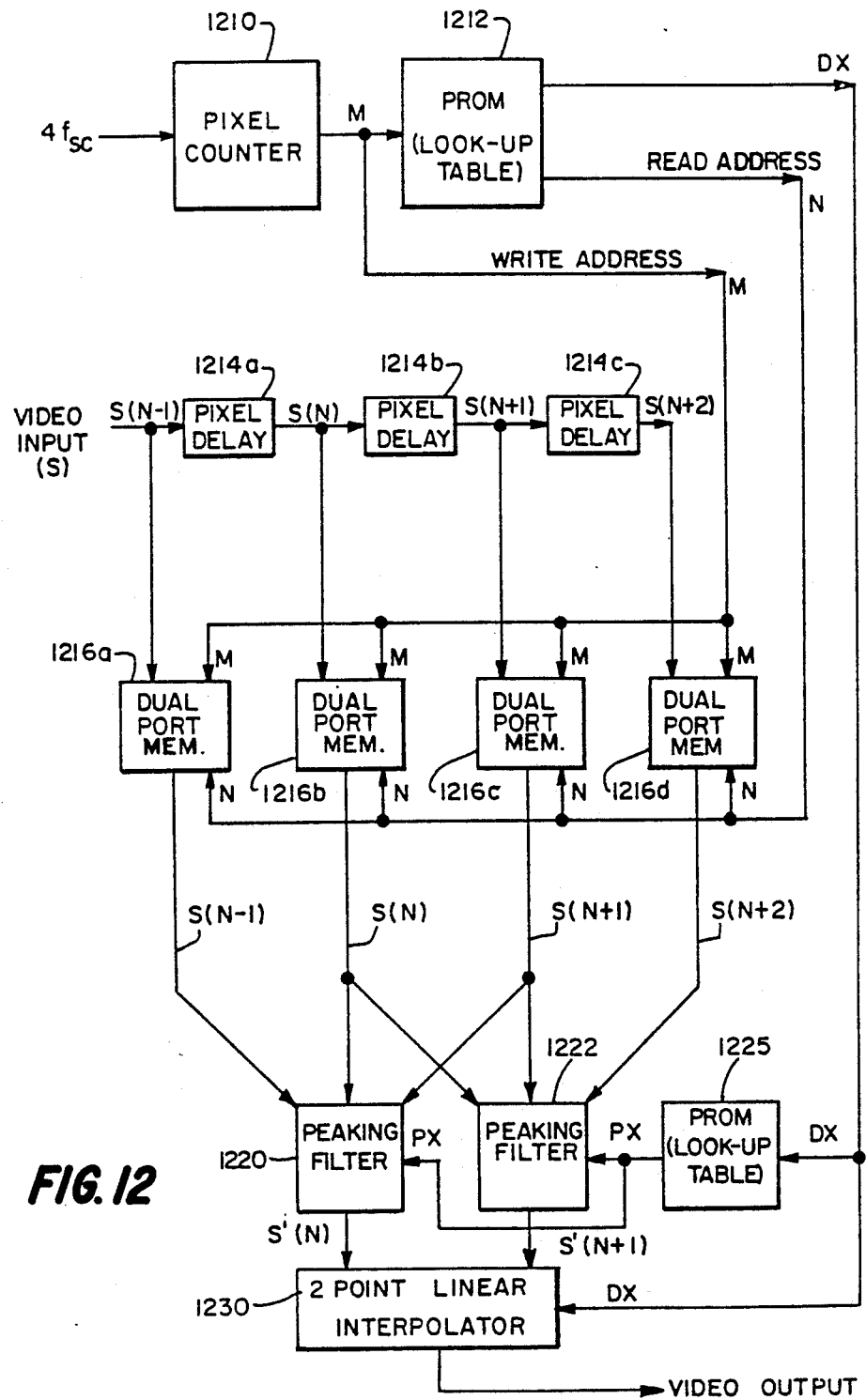
Figure 12A:
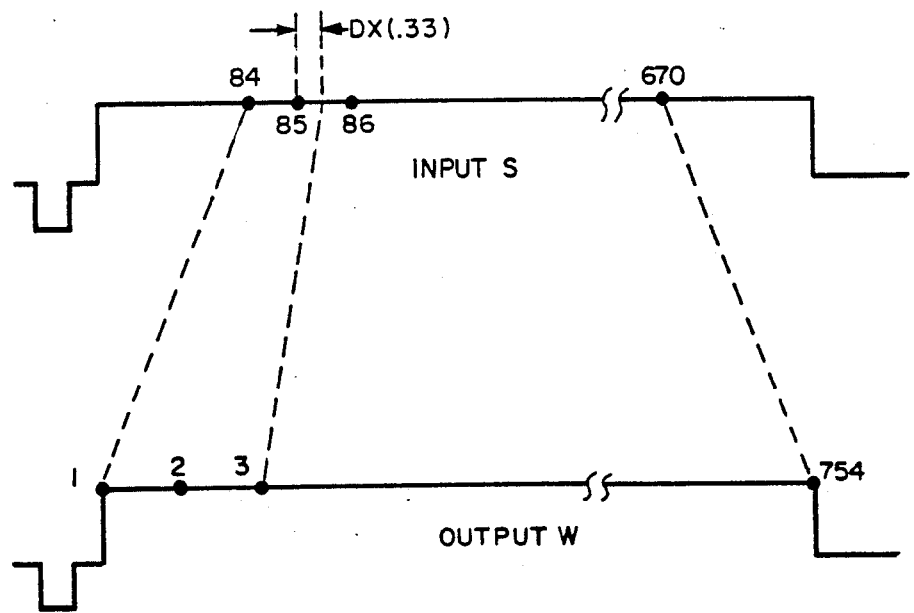

FIG. 12 illustrates raster mapping apparatus which can be used for the time expanders and compressors of FIGS. 6 and 7. In this regard, reference is made to the waveforms of FIG. 12a which illustrates the mapping process. FIG. 12a shows an input signal waveform S with a center portion between pixels 84 and 670 which is intended to be mapped into pixel locations 1–754 of an output waveform W by means of a time expansion process. End point pixels 1 and 670 of waveform S map directly into end point pixels 1 and 754 of waveform W. Intermediate pixels do not map directly on a 1:1 basis due to the time expansion, and in many cases do not map on an integer basis. The latter case is illustrated when, for example, pixel location 85.33 of input waveform S corresponds to integer pixel location 3 of output waveform W. Thus pixel location 85.33 of signal S contains an integer part (85) and a fractional part DX (0.33), and pixel location 3 of waveform W contains an integer part (3) and a fractional part (0).

In FIG. 12, a pixel counter operating at a 4×fsc rate provides an output WRITE ADDRESS signal M representative of pixel locations (1 . . . 754) on an output raster. Signal M is applied to PROM (Programmable Read Only Memory) 1212 which includes a look-up table containing programmed values depending upon the nature of raster mapping to be performed, eg., compression or expansion. In response to signal M, PROM 1212 provides an output READ ADDRESS signal N representing an integer number, and an output signal DX representing a fractiona number equal to or greater than zero but less than unity. In the case of a 6-bit signal DX ($2^6=64$), signal DX exhibits fractional parts 0, 1/64, 2/64, 3/64 . . . 63/64.

PROM 1212 permits expansion or compression of a video input signal S as a function of stored values of signal N. Thus a programmed value of READ ADDRESS signal N and a programmed value of fractional part signal DX are provided in response to integer values of pixel location signal M. To achieve signal expansion, for example, PROM 1212 is arranged to produce signal N at a rate slower than that of signal M. Conversely, to achieve signal compression, PROM 1212 provides signal N at a rate greater than that of signal M.

Video input signal S is delayed by cascaded pixel delay elements 1214a, 1214b and 1214c to produce video signals S(N+2), S(N+1) and S(N) which are mutually delayed versions of the video input signal. These signals are applied to video signal inputs of respective dual port memories 1216a-1216d, as are known. Signal M is applied to a write address input of each of memories 1216a-1216d, and signal N is applied to a read address input of each of memories 1216a-1216d. Signal N determines where incoming video signal information will be written into the memories, and signal N determines which values will be read out of the memories. The memories can write into one address while simultaneously reading out of another address. Output signals S(N−1), S(N), S(N+1) and S(N+2) from memories 1216a-1216d exhibit a time expanded or time compressed format depending upon the read/write operation of memories 1216a-1216d, which is a function of how PROM 1212 is programmed.

Figure 12B:
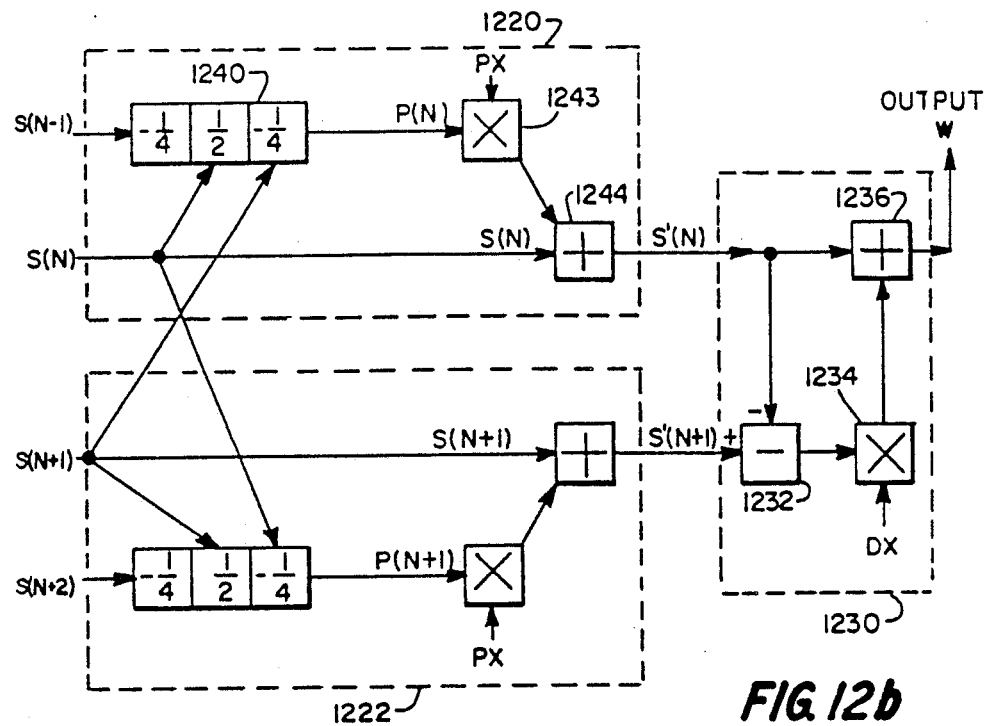
Figure 12C:
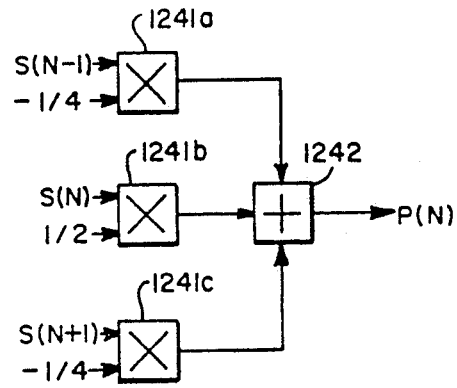
Figure 12D:
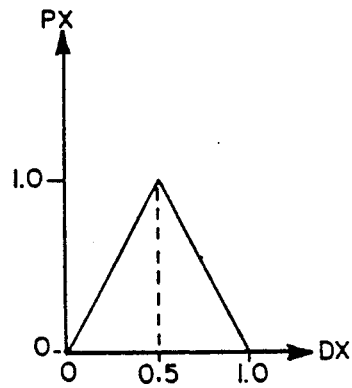

Signals S(N−1), S(N), S(N+1) and S(N+2) from memories 1216a-1216d are processed by a four-point linear interpolator including peaking filters 1220 and 1222, a PROM 1225 and a two point linear interpolator 1230, details of which are shown in FIGS. 12b and 12c. Peaking filters 1220 and 1222 receive three signals from the group of signals including signals S(N−1), S(N), S(N+1) and S(N+2), as shown, as well as receiving a peaking signal PX. The value of peaking signal PX varies from zero to unity as a function of the value of signal DX, as shown in FIG. 12d, and is provided by PROM 1225 in response to signal DX. PROM 1225 includes a look-up table and is programmed to produce a given value of PX in response to a give value of DX.

Peaking filters 1220 and 1222 respectively provide peaked mutually delayed video signals S'(N) and S'(N+1) to two-point linear interpolator 1230 which also receives signal DX. Interpolator 1230 provides a (compressed or expanded) video output signal, where output signal W is defined by the expression $$W=S'(N)+DX[S'(N+1)-S'(N)]$$

The described four-point interpolator and peaking function advantageously approximates a (sin X)/X interpolation function with good resolution of high frequency detail.

FIG. 12b shows details of peaking filters 1220 and 1222, and interpolator 1230. In FIG. 12b, signals S(N−1), S(N) and S(N+1) are applied to a weighting circuit 1240 in peaking filter 1220 where these signals are respectively weighted by peaking coefficients $-\frac{1}{4}$, $\frac{1}{2}$ and $-\frac{1}{4}$. As shown in FIG. 12c, weighting circuit 1240 comprises multipliers 1241a-1241c for respectively multiplying signals S(N−1), S(N) and S(N+1) with peaking coefficients $-\frac{1}{4}$, $\frac{1}{2}$ and $-\frac{1}{4}$. Output signals from multipliers 1241a-1241c are summed in an adder 1242 to produce a peaked signal P(N), which is multiplied by signal PX in multiplier 1243 to produce a peaked signal which is summed with signal S(N) in adder 1244 to produce peaked signal S'(N). Peaking filter 1222 exhibits similar structure and operation.

In two point interpolator 1230, signal S'(N) is subtracted from signal S'(N+1) in a subtractor 1232 to produce a difference signal which is multiplied by signal DX in a multiplier 1234. The output signal from multiplier 1234 is summed with signal S'(N) in an adder 1236 to produce output signal W.

Figure 15:
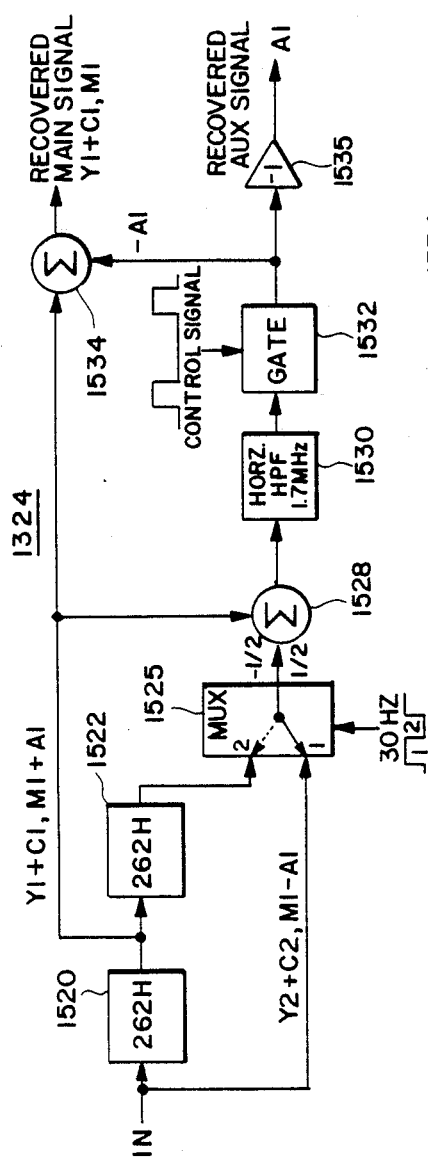
FIGS. 15 and 16 illustrate intraframe processor apparatus according to the present invention in a signal decoder.

FIG. 15 shows details of intraframe processor 1324 of FIG. 13. The decoder apparatus of FIG. 15 is basically similar to the encoder apparatus of FIG. 11b.

An input composite video signal to processor 1324 in FIG. 15 includes, in a first field, signal components "Y1+C1" and "M1+A1". In a succeeding second field the input signal includes components "Y2+C2" and "M1−A1". Components Y1+C1, M1 and Y2+C2, M1 are components provided by intraframe processor 38 as discussed in detail in connection with FIG. 11b. Components +A1 and −A1 represent the alterate subcarrier signal modulated with component 2 and component 3 intraframe averaged information from units 64 and 76, for respective succeeding fields. In this regard reference is made to FIGS. 1, 1a and FIG. 1d in particular.

The intraframe processor of FIG. 15 operates in essentially the same manner as the arrangement of FIG. 11b discussed previously. With MUX 1525 in position 1, field difference component is obtained at the output of combiner 1528. After filtering by high pass filter 1530 and gating by unit 1532, the result is a component −A1 which, when combined with signal Y1+C1, M1+A1 in combiner 1534, cancels the modulated auxiliary subcarrier component (+A1) to produce a recovered main signal Y1+C1, M1. Component Y1+C1 of the recovered main signal is unaltered below the 1.7 MHz cut-off frequency of high pass filter 1530, and component M1 represents intraframe averaged center panel information above approximately 1.7 MHz. The field difference cancellation term (−A1), after inversion by a unity gain amplifier 1535, is the recovered modulated auxiliary signal A1.

Recovered main signal Y1+C1, M1 corresponds to signal N in FIG. 13, and is further processed by network 1342 as discussed. Recovered auxiliary signal A1 corresponds to signal M in FIG. 13 and is demodulated by network 1326.

Figure 16:
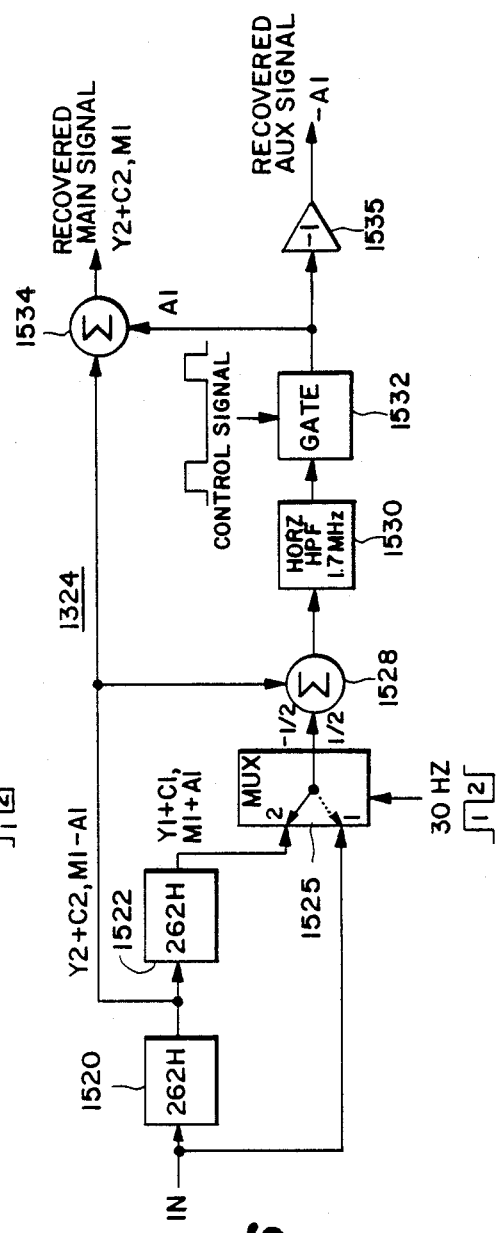

FIG. 16 illustrates the operation of network 1324, as shown in FIG. 15, for the next succeeding image field. In this case signal Y2+C2, M1−A1 is developed between delay elements 1520 and 1522, and MUX 1528 occupies position 2 for receiving signal Y1+C1, M1+A1. A recovered main signal Y2+C2, M1 is produced at the output of combiner 1534, and an oppositely phased modulated auxiliary signal −A1 is recovered.

In FIG. 18 an H-V-T bandpass filter 1810, which has the configuration of FIG. 10c and a passband of 3.58±0.5 MHz, passes signal NTSCH to a subtractive combiner 1814, which also receives signal NTSCH after being passed through a transit time equalizing delay 1812. Separated luminance highs signal YH appears at the output of combiner 1814. The filtered NTSCH signal from filter 1810 is quadrature demodulated by a demodulator 1816 in response to chrominance subcarrier signal SC for producing chrominance highs IH and QH.

In FIG. 19, signals YN, IN and QN are separated into compressed side panel lows YO, IO, QO and into expanded center panel signals YE, IE, QE by means of a side-center panel signal separator (time de-multiplexer) 1940. Demultiplexer 1940 can employ the principles of demultiplexer 816 of FIG. 8 discussed previously.

Signals YO, IO and QO are time expanded by a side expansion factor (corresponding to the side compression factor in the encoder of FIG. 1a) by means of a time expander 1942 to restore the original spatial relationship of the side panel lows in the widescreen signal, as represented by restored side panel lows signals YL, IL and QL. Similarly, to make room for the side panels, center panel signals YE, IE and QE are time compressed by a center compression factor (corresponding to the center expansion factor in the encoder of FIG. 1a) by means of a time compressor 1944 to restore the original spatial relationship of the center panel signal in the widescreen signal, as represented by restored center panel signals YC, IC and QC. Compressor 1944 and expander 1942 can be of the type shown in FIG. 12 discussed previously.

Spatially restored side panel highs YH, IH and QH are combined with spatially restored side panel lows YL, IL and QL by a combiner 1946 to produce reconstructed side panel signals YS, IS and QS. These signals are spliced to reconstructed center panel signal YC, IC and QC by means of a splicer 1960 to form a fully reconstructed widescreen luminance signal YF' and fully reconstructed widescreen color difference signals IF' and QF'. Splicing of the side and center panel signal components is accomplished in a manner which virtually eliminates a visible seam at the boundary between the center and side panels, as will be seen from the subsequent discussion of splicer 1960 shown in FIG. 14.

In FIG. 20, interlace signals IF' (or QF') are delayed 263H by an element 2010 before being applied to an input of a dual port memory 2020. This delayed signal is subjected to an additional 262H delay by an element 2012 before being added with the input signal in adder 2014. The output signal from adder 2014 is coupled to a divide-by-two network 2016 before being applied to an input of a dual port memory 2018. Memories 2020 and 2018 read data at an 8×fsc rate and write data at a 4×fsc rate. Outputs from memories 2018 and 2020 are applied to a multiplexer (MUX) 2022 for producing output progressive scan signals IF (QF). Also shown are waveforms illustrative of the interlace input signal (two lines, with pixel samples C and X designated) and the progressive scan output signal comprising pixel samples C and X.

FIG. 21 illustrates apparatus suitable for use as converter 1350 for signal YF' in FIG. 13. Interlaced signal YF' is delayed by elements 2110 and 2112 before being combined in an adder 2114 as shown. The delayed signal from element 2110 is applied to a dual port memory 2120. An output signal from adder 2114 is coupled to a divide-by-two network 2116, the output of which is added to signal YT in an adder 2118. The output from adder 2118 is applied to a dual port memory 2122. Memories 2120 and 2122 write at a 4×fsc rate and read at an 8×fsc rate, and provide output signals to a multiplexer 2124 which develops progressive scan signal YF.

Figure 14:
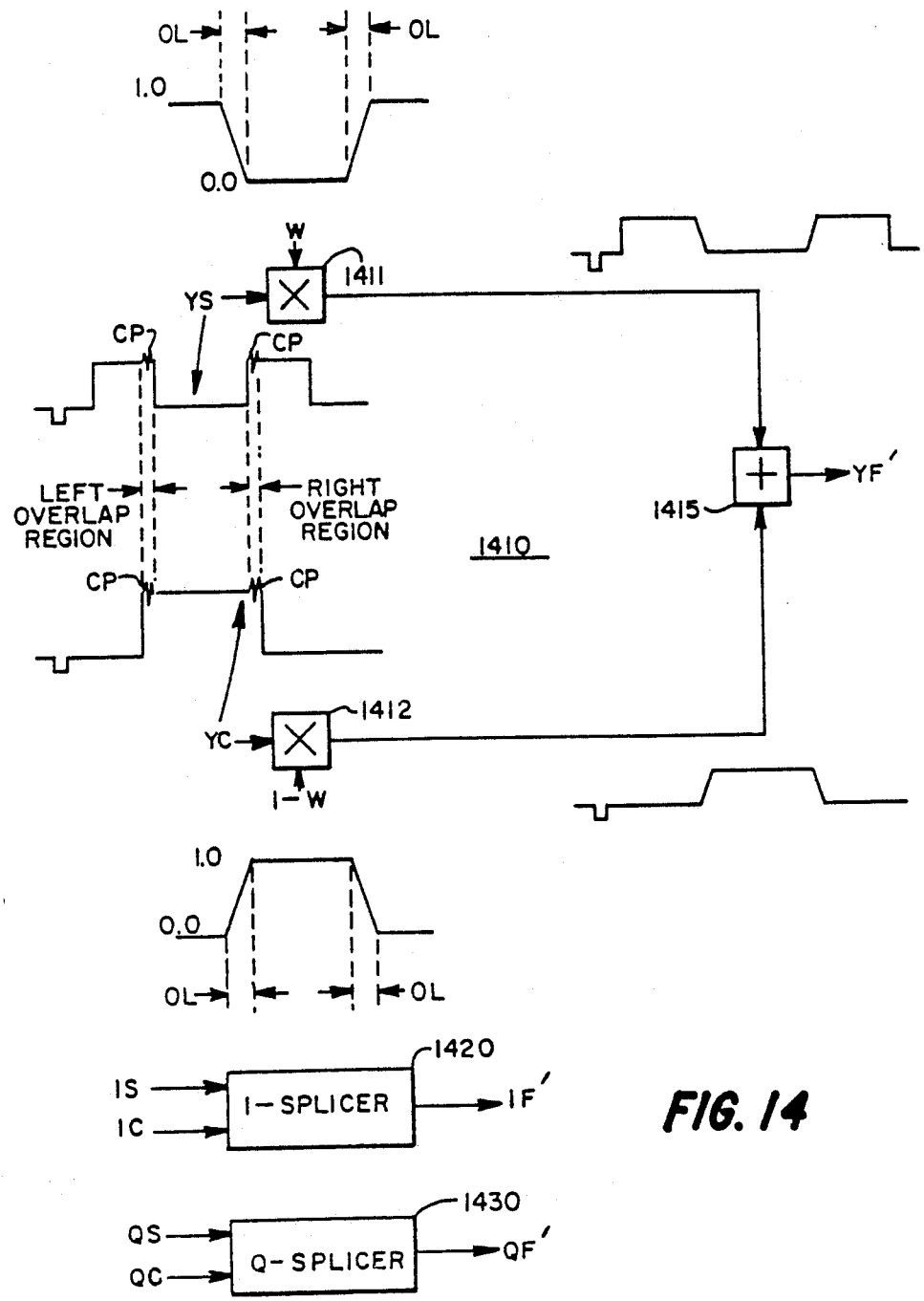

FIG. 14 depicts side panel-center panel splicing apparatus suitable for use as splicer 1960 in FIG. 19, for example. In FIG. 14, the splicer is shown as comprising a network 1410 for producing full bandwidth luminance signal YF' from side panel luminance signal component YS and center panel luminance signal component YC, as well as an I signal splicer 1420 and a Q signal splicer 1430 which are similar in structure and operation to network 1410. The center panel and the side panels are purposely overlapped by several pixels, e.g. ten pixels. Thus the center and side panel signals have shared several redundant pixels throughout the signal encoding and transmission process prior to splicing.

In the widescreen receiver, the center and side panels are reconstructed from their respective signals, but because of the time expansion, time compression and filtering performed on the panel signals, several pixels at the side and center panel boundaries are corrupted, or distorted. The overlap regions (OL) and corrupted pixels (CP; slightly exaggerated for clarity) are indicated by the waveforms associated with signals YS and YC in FIG. 14. If the panels had no overlap region, the corrupted pixels would be abutted against each other, and a seam would be visible. An overlap region ten pixels wide has been found to be wide enough to compensate for three to five corrupted boundary pixels.

The redundant pixels advantageously allow blending of the side and center panels in the overlap region. A multiplier 1411 multiplies side panel signal YS by a weighting function W in the overlap regions, as illustrated by the associated waveform, before signal YS is applied to a signal combiner 1415. Similarly, a multiplier 1412 multiplies center panel signal YC by a complementary weighting function (1-W) in the overlap regions, as illustrated by the associated waveform, before signal YC is applied to combiner 1415. These weighting functions exhibit a linear ramp-type characteristic over the overlap regions and contain values between 0 and 1. After weighting, the side and center panel pixels are summed by combiner 1415 so that each reconstructed pixel is a linear combination of side and center panel pixels.

The weighting functions preferably should approach unity near the innermost boundary of the overlap region, and shoulld approach zero at the outermost boundary. This will insure that the corrupted pixels having relatively little influence on the reconstructed panel boundary. The illustrated linear ramp type weighting function satisfies this requirement. However, the weighting functions need not be linear, and a nonlinear weighting function with curvilinear or rounded end portions, i.e. in the vicinity of 1 and 0 weight points, can also be used. Such a weighting function can readily be obtained by filtering a linear ramp weighting function of the type illustrated.

Weighting functions W and 1-W can be readily generated by a network including a look-up table responsive to an input signal representative of pixel positions, and a subtractive combiner. The side-center pixel overlap locatons are known, and the look-up table is programmed accordingly to provide output values from 0 to 1, corresponding to weighting function W, in response to the input signal. The input signal can be developed in a variety of ways, such as by a counter synchronized by each horizontal line synchronizing pulse. Complementary weighting function 1-W can be produced by subtracting weighting function W from unity.

FIG. 22 shows apparatus suitable for use as progressive scan to interlace converter 17c for signal YF in FIG. 1a. FIG. 22 also shows a diagram of a portion of progressive scan input signal YF with samples A, B, C and X in a vertical (V) and temporal (T) plane indicated, as also shown in FIG. 2a. Progressive scan signal YF is subjected to a 525H delay via elements 2210 and 2212 for producing relatively delayed samples X and A from sample B. Samples B and A are summed in an adder 2214 before being applied to a divide-by-two network 2216. An output signal from network 2216 is subtractively combined in a network 2218 with sample X to product signal YT. Signal YT is applied to an input of a dual-port memory 2222, and signal YF from the output of delay 2210 is applied to an input of a dual-port memory 2223. Both memories 2222 and 2223 read at a 4×fsc rate and write at an 8×fsc rate, for producinng signals YF' and YT in interlace form at respective outputs.

FIG. 23 shows apparatus suitable for use as converters 17a and 17b in FIG. 1a. In FIG. 23 progressive scan signal IF (or QF) is applied to a 525H delay element 2310 before being applied to a dual port memory 2312 which reads at a 4×fasc rate and writes at an 8×fsc rate, for producinng interlace output signal IF' (or QF'). Also shown are waveforms illustrative of the progressive scan input signal with first and second lines associated with samples C and X, and the interlace output signal (the first line with sample C stretched at a H/2 rate). Dual port memory 2312 outputs only the first line sample (C) of the input signal, in stretched form.

FIG. 24 shows details of unit 80. Signals X and Z are applied to address inputs of non-linear amplitude compressors 2410 and 2412, respectively. Compressors 2410 and 2412 are programmable read-only memory (PROM) devices each including a look-up table containing programmed values corresponding to the desired non-linear gamma compression function. This function is illustrated by the instantaneous input vs. output response adjacent to unit 2412. Compressed signals X and Z from data outputs of units 2410 and 2412 are applied to signal inputs of signal multipliers 2414 and 2416, respectively. Reference inputs of multipliers 2414 and 2416 receive respective alternate subcarrier signals ASC in mutually quadrature phase relationships, i.e., signals ASC are in sine and cosine form. Output signals from multipliers 2414 and 2416 are added in a combiner 2420 to produce quadrature modulated signal M. In the decoder arrangement of FIG. 13, compressed signals X and Z are recovered via a conventional quadrature demodulation technique, and complementary non-linear amplitude expansion of these signals is performed by associated PROMs with look-up tables programmed with values complementary to the values of PROMs 2410 and 2412.

What is claimed is:

1. Video signal processing apparatus comprising:
signal delay means having an input for receiving a video signal, an output, and a point intermediate said input and output;
means for selectively coupling (a) signals from said input and said intermediate point to a signal path during a first interval, and (b) signals from said intermediate point and said output to said signal path during a second interval; and
first means for combining signals from said intermediate point and said signal path; wherein
said delay means receives a television-type signal representative of a widescreen image having side portion image information and dominant nonside portion image information, and an image aspect ratio greater than that of a standard television image;
said television-type signal contains a first component having side portion image information time compressed into an overscan region of said first component, and having dominant nonside portion information, said first component having been intraframe processed over a high frequency portion of said nonside portion information exclusive of said compressed side portion information; and
said signal path includes a high pass filter and a gate for enabling said signal path to conduct a signal from said selective coupling means substantially only during intervals associated with said dominant nonside portion information.

2. Apparatus according to claim 1, wherein:
during said first interval said selective coupling means provides a difference signal to said signal path representative of a difference in information content between signals at said delay means input and at said intermediate point;
during said second interval said selective coupling means provides a difference signal to said signal path representative of a difference in information content between signals at said delay means output and at said intermediate point;
said signal delay means exhibits an interval of 262H between said input and said intermediate point and between said intermediate point and said output, where H is a horizontal line interval; and
said first and second intervals are image field intervals.

3. Apparatus according to claim 2, wherein:
said television-type signal contains a second component comprising intraframe processed auxiliary information modulating an alternate subcarrier, other than a chrominance subcarrier, having a phase which reverses from one image field to the next.

4. Apparatus according to claim 3, and further comprising:
signal inverting means having an input coupled to said signal path subsequent to said high pass filter and gate, and an output for providing said second component.

5. Apparatus according to claim 1, wherein:
during said first interval said selective coupling means provides a difference signal to said signal path representative of a difference in information content between signals at said delay means input and at said intermediate point; and
during said second interval said selective coupling means provides a difference signal to said signal path representative of a difference in information content between signals at said delay means output and at said intermediate point.

6. Apparatus according to claim 1, wherein:
said signal delay means exhibits an interval of 262H between said input and said intermediate point and between said intermediate point and said output, where H is a horizontal line interval; and
said first and second intervals are image field intervals.

7. Apparatus according to claim 6, wherein:

a combined signal provided by said first combining means contains intraframe processed high frequency information exclusive of low frequency information.

8. Apparatus according to claim 1, wherein said selective coupling means comprises:

second combining means having a first input for receiving a signal from said intermediate point, an output coupled to said signal path, and a second input; and switching means for coupling signals from said input of said delay means to said second input of said second combining means during said first interval, and for coupling signals from said output of said delay means to said second input of said second combining means during said second interval.

9. Apparatus according to claim 8, wherein:

signals processed by said second combining means are substantially equally weighted and of opposite polarity.

* * * * *